(12) United States Patent
Hita et al.

(10) Patent No.: US 11,001,154 B2
(45) Date of Patent: May 11, 2021

(54) HYBRID CONSTRUCTION MACHINE

(71) Applicant: Hitachi Construction Machinery Co., Ltd., Tokyo (JP)

(72) Inventors: Masafumi Hita, Tsuchiura (JP); Shinya Imura, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 143 days.

(21) Appl. No.: 16/330,149

(22) PCT Filed: Nov. 6, 2017

(86) PCT No.: PCT/JP2017/039913
§ 371 (c)(1),
(2) Date: Mar. 4, 2019

(87) PCT Pub. No.: WO2018/088354
PCT Pub. Date: May 17, 2018

(65) Prior Publication Data
US 2019/0211528 A1 Jul. 11, 2019

(30) Foreign Application Priority Data
Nov. 9, 2016 (JP) .............................. JP2016-218934

(51) Int. Cl.
*E02F 9/20* (2006.01)
*E02F 9/00* (2006.01)
(Continued)

(52) U.S. Cl.
CPC .............. *B60L 50/61* (2019.02); *B60K 6/485* (2013.01); *B60L 50/16* (2019.02); *B60L 50/60* (2019.02);
(Continued)

(58) Field of Classification Search
CPC ................ E02F 9/20; E02F 9/00; F16D 31/02
See application file for complete search history.

(56) References Cited

U.S. PATENT DOCUMENTS

2007/0142168 A1  6/2007  DeMarco
2009/0132116 A1  5/2009  Tanaka et al.
(Continued)

FOREIGN PATENT DOCUMENTS

JP  2006-149181 A  6/2006
JP  2007-326404 A  12/2007
(Continued)

OTHER PUBLICATIONS

Extended European Search Report issued in European Application No. 17870611.5 dated May 26, 2020 (10 pages).
(Continued)

*Primary Examiner* — Yuri Kan
(74) *Attorney, Agent, or Firm* — Crowell & Moring LLP

(57) ABSTRACT

An HCU (37) includes a battery low temperature reducing output calculating section (71A) that determines, when it is determined that an electricity storage device (31) is in a low temperature state by a battery temperature Tb, a battery low temperature reducing output PbL that is made to a larger value as the battery temperature Tb is lower, a hydraulic oil low temperature reducing output calculating section (71B) that determines, when it is determined that hydraulic oil is in a low temperature state by a hydraulic oil temperature To, a hydraulic oil low temperature reducing output PoL that is made to a larger value as the hydraulic oil temperature To is lower, and an output command calculating section (80) that controls a vehicle body operation based upon a sum of the battery low temperature reducing output PbL and the hydraulic oil low temperature reducing output PoL.

7 Claims, 16 Drawing Sheets

(51) Int. Cl.
　　　*F16D 31/02*　　　(2006.01)
　　　*B60L 50/61*　　　(2019.01)
　　　*B60W 10/08*　　　(2006.01)
　　　*B60W 10/26*　　　(2006.01)
　　　*H01M 10/44*　　　(2006.01)
　　　*H01M 10/48*　　　(2006.01)
　　　*H02J 7/04*　　　(2006.01)
　　　*B60W 20/13*　　　(2016.01)
　　　*B60L 50/16*　　　(2019.01)
　　　*B60W 20/00*　　　(2016.01)
　　　*H02J 7/00*　　　(2006.01)
　　　*B60L 58/15*　　　(2019.01)
　　　*B60L 58/13*　　　(2019.01)
　　　*B60L 58/14*　　　(2019.01)
　　　*B60L 50/60*　　　(2019.01)
　　　*B60K 6/485*　　　(2007.10)
　　　*E02F 9/22*　　　(2006.01)

(52) U.S. Cl.
　　　CPC .............. *B60L 58/13* (2019.02); *B60L 58/14* (2019.02); *B60L 58/15* (2019.02); *B60W 10/08* (2013.01); *B60W 10/26* (2013.01); *B60W 20/00* (2013.01); *B60W 20/13* (2016.01); *E02F 9/20* (2013.01); *E02F 9/2075* (2013.01); *E02F 9/2091* (2013.01); *H01M 10/44* (2013.01); *H01M 10/48* (2013.01); *H02J 7/00* (2013.01); *H02J 7/04* (2013.01); *E02F 9/2235* (2013.01); *Y02T 10/70* (2013.01); *Y02T 10/7072* (2013.01)

(56) References Cited

U.S. PATENT DOCUMENTS

2010/0031650　A1*　2/2010　Morinaga ............... B60L 50/16
　　　　　　　　　　　　　　　　　　　　　　　　　　　　60/459
2015/0046003　A1　　2/2015　Doi
2016/0215480　A1　　7/2016　Ishihara et al.

FOREIGN PATENT DOCUMENTS

JP　　　2008019589 A　*　1/2008　............... E02F 9/00
JP　　　2015-35841 A　　　2/2015
JP　　　2015-86664 A　　　5/2015

OTHER PUBLICATIONS

Batteryspace: "Lithium Ion Battery Specifications Type: Cylindrical Lithium Iron Phosphate Battery Mode: LFP-26650-3300 AA Portable Power Corp", Mar. 7, 2013, pp. 1-8, XP55695149, (eight (8) pages).

International Search Report (PCT/ISA/210) issued in PCT Application No. PCT/JP2017/039913 dated Feb. 6, 2018 with English translation (five (5) pages).

Japanese-language Written Opinion (PCT/ISA/237) issued in PCT Application No. PCT/JP2017/039913 dated Feb. 6, 2018 (four (4) pages).

* cited by examiner

HYBRID CONSTRUCTION MACHINE

TECHNICAL FIELD

The present invention relates to a hybrid construction machine on which an engine and a motor generator are mounted.

BACKGROUND ART

In general, there is known a hybrid construction machine provided with a motor generator that is jointed mechanically to an engine and a hydraulic pump, and an electricity storage device such as a lithium ion battery (for example, refer to Patent Document 1 and Patent Document 2). In this hybrid construction machine, the motor generator plays a role of charging power generated by a driving force of the engine in the electricity storage device or assisting in the engine by a power running operation using power of the electricity storage device. Many hybrid construction machines are provided with an electric motor separated from the motor generator, and the electric motor acts for or assists in an operation of a hydraulic actuator. For example, at the time of performing a revolving operation by the electric motor, the electric motor performs or assists in the revolving operation of an upper revolving structure by power supply to the electric motor, and braking energy at a revolving stop is regenerated to perform charge of the electricity storage device.

In this hydraulic construction machine, it is possible to enhance a reduction effect of a fuel consumption by increasing the output of the motor generator or revolving electric motor. However, when the output of the motor generator or the like is made large, there are some cases where the electricity storage device cannot supply sufficient power due to the limitations of a discharge capability, a capacitance, a temperature and the like of the electricity storage device. In this case, continuation of the power supply from the electricity storage device leads to hard use of the electricity storage device, accelerating degradation of the electricity storage device.

In the electricity storage device using a chemical reaction, such as the lithium ion battery, the output is lower in a low temperature state as compared to a normal temperature state. Even when charge and discharge are repeatedly performed within a range of the lowered output in such a low temperature state, it leads to hard use of the electricity storage device, causing large performance degradation in the electricity storage device.

There is known a control device configured in consideration of the above problems. For example, Patent Document 1 discloses the configuration that a maximum value of charge/discharge power that can be outputted in accordance with a temperature of the electricity storage device is calculated and the electricity storage device is used within a range of the calculated value.

Patent Document 2 discloses the configuration that, for suppressing degradation of the electricity storage device, when a current square integrated value exceeds a specified value, a discharge amount of the electricity storage device is limited according to the increasing amount. At this time, the current square integrated value shows a use amount of the electricity storage device for a constant time from the present to the past.

PRIOR ART DOCUMENT

Patent Document

Patent Document 1: Japanese Patent Laid-Open No. 2015-35841 A
Patent Document 2: Japanese Patent Laid-Open No. 2006-149181 A

SUMMARY OF THE INVENTION

Incidentally a hybrid construction machine performs a warming operation or a regular work even in a low temperature state. Therefore, it is preferable to ensure as much operational performance of a vehicle body as possible even in the low temperature. However, since a low temperature state of the electricity storage device is generally caused by a low outside-air temperature, a hydraulic oil temperature at this time is likewise made low. Since viscosity of the hydraulic oil increases in a low temperature state, a drag torque of a pump increases more than at a normal temperature time. On the other hand, in the hybrid construction machine described in Patent Document 1, the maximum discharge power of the electricity storage device is made low in the low temperature state.

Therefore, when the hydraulic pump is driven in the low temperature state for ensuring the operational performance of the vehicle body, an assist motor cannot respond to an increase in pump drag torque, possibly causing lug-down in which an engine rotational speed is temporarily reduced.

On the other hand, there is a tendency that the maximum value of the current square integrated value becomes very small in the low temperature state. Accordingly, the current square integrated value varies in a speed faster than at a normal temperature time even in a case of increasing to close to the maximum value and even in a case of reducing from the maximum value. Therefore, as disclosed in Patent Document 2, when the electricity storage device is controlled to limit the power after being close to an upper limit value, there is posed a problem that an increase and a decrease in the vehicle body speed are frequently switched to give operational stress to an operator.

The present invention is made in view of the aforementioned problems in the conventional technology, and an object of the present invention is to provide a hybrid construction machine that enables appropriate use of an electricity storage device in a low temperature state.

For solving the above problems, a hybrid construction machine according to the present invention comprises an engine; a motor generator that is connected mechanically to the engine; an electricity storage device that charges at a power generation operation of the motor generator and discharges at a power running operation of the motor generator; a hydraulic pump that is driven by torque of the engine and the motor generator; a plurality of hydraulic actuators that are driven by hydraulic oil delivered from the hydraulic pump; and a controller that controls output of the engine and the motor generator, characterized in that:

the hybrid construction machine further comprises: an electricity storage device temperature detector that detects a temperature of the electricity storage device; and a hydraulic oil temperature detector that detects a temperature of the hydraulic oil, the controller includes: a First vehicle body speed reduction amount determining section that determines, when it is determined that the electricity storage device is in a low temperature state based upon the temperature detected by the electricity storage device temperature detector, a first vehicle body speed reduction amount that is made to a larger value as the temperature of the electricity storage device is lower; a second vehicle body speed reduction amount determining section that determines, when it is determined that the hydraulic oil is in a low temperature state based upon the temperature detected by the hydraulic oil temperature detector, a second vehicle body speed reduction amount that is made to a larger value as the temperature of the hydraulic oil is lower; and a vehicle body operation control part that controls a vehicle body operation based upon a sum of the first vehicle body speed reduction amount and the second vehicle body speed reduction amount.

According to the present invention, the appropriate use of the electricity storage device is made possible in the low temperature state.

MODE FOR CARRYING OUT THE INVENTION

Figure 1:
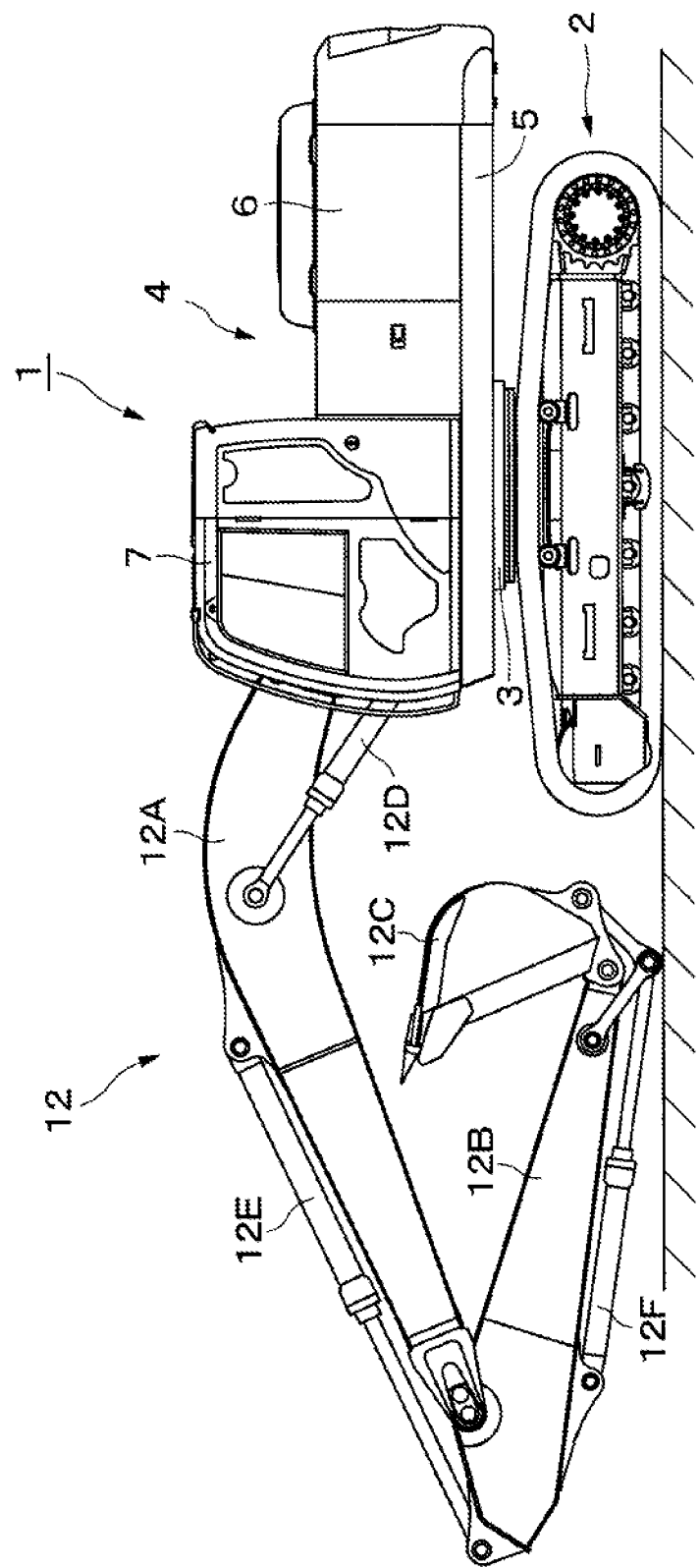
FIG. 1 is a front view showing a hybrid hydraulic excavator according to an embodiment of the present invention.

Hereinafter, a hybrid hydraulic excavator as an example of a hybrid construction machine according to an embodiment in the present invention will be explained with reference to the accompanying drawings.

FIG. 1 to FIG. 16 show an embodiment of the present invention. A hybrid hydraulic excavator 1 (hereinafter, referred to as "hydraulic excavator 1") is provided with an engine 20 and a motor generator 27, which will be described later. The hydraulic excavator 1 includes an automotive lower traveling structure 2 of a crawler type, a revolving device 3 that is provided on the lower traveling structure 2, an upper revolving structure 4 that is mounted through the revolving device 3 on the lower traveling structure 2 to be capable of revolving thereon, and a working mechanism 12 of an articulated structure that is provided in the front side of the upper revolving structure 4 and performs an excavating operation of earth and sand, and the like. At this time, the lower traveling structure 2 and the upper revolving structure 4 configure a vehicle body of the hydraulic excavator 1.

Figure 2:
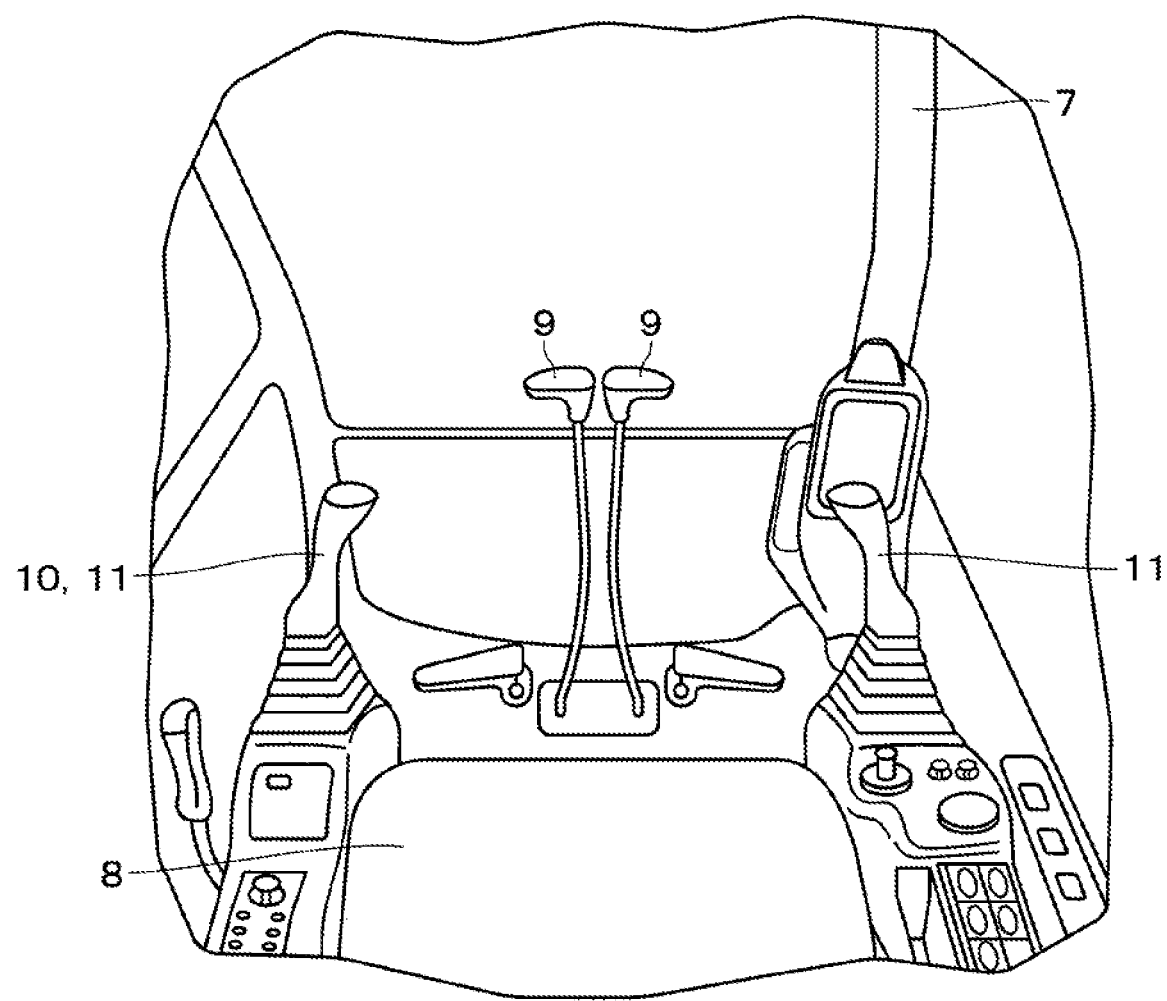
FIG. 2 is a perspective view showing an essential part showing the inside of a cab in FIG. 1.

The upper revolving structure 4 is provided with a housing cover 6 that is provided on a revolving frame 5 to accommodate therein the engine 20 and the like, and a cab 7 for an operator to get in. As shown in FIG. 2, an operator's seat 8 on which an operator sits is provided in the cab 7, and a traveling operation device 9 that is composed of operating levers, operating pedals and the like, a revolving operation device 10 that is composed of an operating lever and the like, and a working operation device 11 that is composed of operating levers and the like are provided in the periphery of the operator's seat 8. In addition, an engine control dial 39 is provided in the cab 7.

The traveling operation device 9 is disposed in front of the operator's seat 8, for example. The revolving operation device 10 corresponds to an operating section of the operating lever in a front-rear direction disposed in the left side to the operator's seat 8, for example. In addition, the working operation device 11 corresponds to an operating section (arm operation) of the operating lever in a left-right direction disposed in the left side to the operator's seat 8, and an operating section (boom operation) of the operating lever in a front-rear direction and an operating section (bucket operation) of the operating lever in a left-right direction disposed in the right side to the operator's seat 8. It should be noted that a relation of an operating direction of the operating lever to a revolving operation or a working operation is not limited to the aforementioned relation, but may be optionally set according to a specification of the hydraulic excavator 1 or the like.

Figure 3:
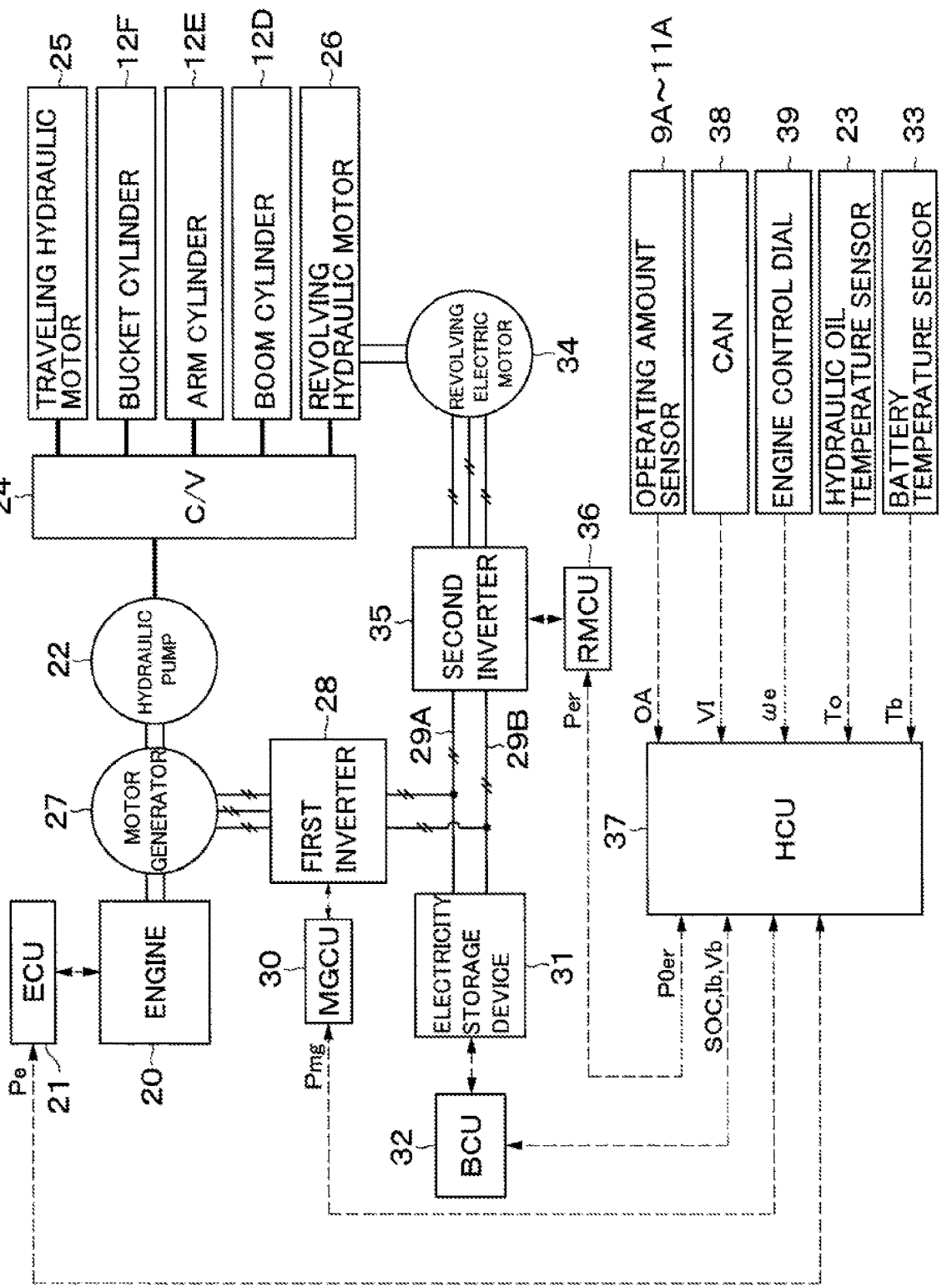
FIG. 3 is a block diagram showing a hydraulic system and an electric system that are applied to the hybrid hydraulic excavator according to the embodiment.

Here, as shown in FIG. 3, the operation devices 9 to 11 are respectively provided with operating amount sensors 9A to 11A that detect their operating amounts (lever operating amount OA). The operating amount sensors 9A to 11A each configure an operating amount detecting part that detects an operating amount at the time of driving a plurality of hydraulic actuators (hydraulic motors 25, 26, cylinders 12D to 12F) respectively. The operating amount sensors 9A to 11A detect an operating state of the vehicle body, such as a traveling operation of the lower traveling structure 2, a revolving operation of the upper revolving structure 4 or a lifting/tilting operation (excavating operation) of a working mechanism 12.

At this time, the operating amount sensor 9A detects an operating amount of a traveling lever/pedal including a forward operating amount and a backward operating amount. The operating amount sensor 10A detects an operating amount of a revolving lever including a left revolving operating amount and a right revolving operating amount. The operating amount sensor 11A detects an operating amount of a boom lever including a boom lifting operating amount and a boom lowering operating amount, an operating amount of an arm lever including an arm lifting operating amount and an arm lowering operating amount, and an operating amount of a bucket lever including a bucket cloud operating amount and a bucket dump operating amount. The lever operating amount OA includes these operating amounts.

As shown in FIG. 1, the working mechanism 12 is configured of, for example, a boom 12A, an arm 12B and a bucket 12C, and a boom cylinder 12D, an arm cylinder 12E and a bucket cylinder 12F for driving them. The boom 12A, the arm 12B and the bucket 12C are pinned to each other. The working mechanism 12 is attached to the revolving frame 5, and extends or contracts the cylinders 12D to 12F to perform a lifting/tilting operation.

Here, the hydraulic excavator 1 is provided thereon with an electric system that controls the motor generator 27 and the like, and a hydraulic system that controls operations of the working mechanism 12 and the like. Hereinafter, an explanation will be made of the system configuration in the hydraulic excavator 1 with reference to FIG. 3.

The engine 20 is mounted on the revolving frame 5. The engine 20 is configured of an internal combustion engine such as a diesel engine. A hydraulic pump 22 and the motor generator 27, which will be described later, are attached mechanically to the output side of the engine 20 for serial connection. The hydraulic pump 22 and the motor generator 27 are driven by the engine 20. Here, an operation of the engine 20 is controlled by an engine control unit 21 (hereinafter, referred to as "ECU 21"). The ECU 21 controls an output torque, a rotational speed (engine rotational number) and the like of the engine 20 based upon an engine output command Pe from a hybrid control unit 37 (hereinafter, referred to as "HCU 37"). It should be noted that the maximum output of the engine 20 is made smaller than the maximum power of the hydraulic pump 22, for example.

The hydraulic pump 22 is connected mechanically to the engine 20. The hydraulic pump 22 can be driven by the torque of the engine 20 alone. In addition, the hydraulic pump 22 can be driven by a compound torque (total torque) acquired by adding an assist torque of the motor generator 27 to the torque of the engine 20. The hydraulic pump 22 pressurizes hydraulic oil reserved in a tank (unshown), which is delivered to a traveling hydraulic motor 25, a revolving hydraulic motor 26, the cylinders 12D to 12F of the working mechanism 12, and the like as hydraulic oil. The tank is provided with a hydraulic oil temperature sensor 23 that detects a hydraulic oil temperature To. The hydraulic oil temperature sensor 23 configures a hydraulic oil temperature detector and outputs a signal in accordance with the hydraulic oil temperature To toward the HCU 37. It should be noted that the hydraulic oil temperature sensor 23 may be provided in a position different from the tank.

The hydraulic pump 22 is connected through a control valve 24 to the traveling hydraulic motor 25, the revolving hydraulic motor 26, and the cylinders 12D to 12F as hydraulic actuators. The hydraulic motors 25, 26 and the cylinders 12D to 12F are driven by the pressurized oil from the hydraulic pump 22. The control valve 24 supplies or discharges the hydraulic oil delivered from the hydraulic pump 22 to or from the traveling hydraulic motor 25, the revolving hydraulic motor 26, and the cylinders 12D to 12F in response to operations to the traveling operation device 9, the revolving operation device 10 and the working operation device 11.

Specifically, the pressurized oil is delivered to the traveling hydraulic motor 25 from the hydraulic pump 22 in response to an operation of the traveling operation device 9. As a result, the traveling hydraulic motor 25 drives/travels the lower traveling structure 2. The pressurized oil is delivered to the revolving hydraulic motor 26 from the hydraulic pump 22 in response to an operation of the revolving operation device 10. As a result, the revolving hydraulic motor 26 performs a revolving operation of the upper revolving structure 4. The pressurized oil is delivered to the cylinders 12D to 12F from the hydraulic pump 22 in response to an operation of the working operation device 11. As a result, the cylinders 12D to 12F cause the working mechanism 12 to perform a lifting/tilting operation.

The motor generator 27 is connected mechanically to the engine 20. The motor generator 27 is configured of, for example, a synchronous electric motor and the like. The motor generator 27 plays two roles of power generation of performing power supply to the electricity storage device 31 and the revolving electric motor 34 by acting as an electric generator using the engine 20 as a power source, and power running of assisting in driving the engine 20 and the hydraulic pump 22 by acting as a motor using power from the electricity storage device 31 and the revolving electric motor 34 as a power source. Accordingly, the assist torque of the motor generator 27 is added to the torque of the engine 20 according to the situation, and the hydraulic pump 22 is driven by the engine torque and the assist torque. The operation of the working mechanism 12, a travel of the vehicle and the like are performed by the pressurized oil delivered from the hydraulic pump 22.

The motor generator 27 is connected to a pair of DC buses 29A, 29B through a first inverter 28. The first inverter 28 is configured using a plurality of switching elements such as a transistor and an insulating gate bipolar transistor (IGBT), and an on/off operation of each of the switching elements in the first inverter 28 is controlled by a motor generator control unit 30 (hereinafter, referred to as "MGCU 30"). The DC buses 29A, 29B are paired at a positive electrode side and at a negative electrode side, and, for example, a DC voltage of approximately several hundreds V is applied thereto.

At the power generation of the motor generator 27, the first inverter 28 converts AC power from the motor generator 27 into DC power, which is supplied to the electricity storage device 31 or the revolving electric motor 34. At the power running operation of the motor generator 27, the first inverter 28 converts the DC power of the DC buses 29A, 29B into AC power, which is supplied to the motor generator 27. The MGCU 30 controls the on/off operation of each of the switching elements in the first inverter 28 based upon a motor generator output command Pmg from the HCU 37 and the like. Thereby, the MGCU 30 controls power generation power at the power generation time of the motor generator 27 and drive power at the power running time of the motor generator 27.

The electricity storage device 31 is connected electrically to the motor generator 27. The electricity storage device 31 is configured of a plurality of cells (not shown) composed of, for example, a lithium ion battery and is connected to the DC buses 29A, 29B.

The electricity storage device 31 is charged with power supplied from the motor generator 27 at the power generation time of the motor generator 27 and supplies drive power toward the motor generator 27 at the power running time (at the assist drive time) of the motor generator 27. In addition, the electricity storage device 31 is charged with regeneration power supplied from the revolving electric motor 34 at the regeneration time of the revolving electric motor 34 and supplies the drive power toward the revolving electric motor 34 at the power running time of the revolving electric motor 34. In this way, the electricity storage device 31 stores therein the power generated by the motor generator 27, and further, absorbs the regeneration power generated by the revolving electric motor 34 at the revolving braking time of the hydraulic excavator 1 to hold the voltage of each of the DC buses 29A, 29B to be constant.

The electricity storage device 31 is controlled by a battery control unit 32 (hereinafter, referred to as "BCU 32"). The BCU 32 configures a power generation electricity storage device state detecting part. The BCU 32 detects a state of charge SOC (State Of Charge). At this time, the state of charge SOC becomes a value corresponding to the electricity storage amount of the electricity storage device 31. In addition, the BCU 32 is provided with, for example, a current sensor that detects current of charge or discharge of the electricity storage device 31 and a voltage sensor that detects a voltage thereof (none of them is shown). The BCU 32 detects current Ib and a voltage Vb of the electricity storage device 31. The BCU 32 outputs the state of charge SOC, the current Ib, the voltage Vb and the like to the HCU 37. The electricity storage device 31 is provided with a battery temperature sensor 33 that detects a battery temperature Tb. The battery temperature sensor 33 configures an electricity storage device temperature detector, and outputs a signal in accordance with the battery temperature Tb toward the HCU 37. It should be noted that the battery temperature sensor 33 may be provided in the BCU 32. The battery temperature sensor 33 may indirectly output the battery temperature Tb to the HCU 37 through the BCU 32 or may directly output it to the HCU 37.

It should be noted that in the present embodiment, a lithium ion battery, for example, having a voltage of 350 V, a discharge capacitance of 5 Ah, an appropriate use range of the state of charge SOC set to, for example, 30% to 70% and an appropriate use cell temperature set to −20° C. to 60° C. is used in the electricity storage device 31. The appropriate use range of the state of charge SOC and the like are not limited to the above values, but are optionally set according to a specification of the electricity storage device 31 or the like.

Here, the maximum output of the engine 20 is smaller than the maximum pump absorption power. In this case, as compared to when the engine 20 has a sufficiently large output to the maximum pump absorption power, a rate of contribution of the engine assist by a power running operation of the motor generator 27 at the vehicle body operation is larger. Therefore, the electricity storage device 31 repeats the charge and discharge with intensity.

When the electricity storage device 31 generally performs excessive charge or discharge, the degradation is accelerated to lower the output. A degradation speed of the electricity storage device 31 differs depending upon the state of charge SOC at the charging or discharging, or intensity of the charge or discharge itself. For example, in the electricity storage device 31 such as a lithium ion battery, an appropriate use range is defined to the state of charge or the cell temperature by a manufacturer (for example, 30% to 70% in the state of charge and −20° C. to 60° C. in the cell temperature). When the electricity storage device 31 is used over this range, the degradation speed greatly increases.

The revolving electric motor 34 (revolving generator) is driven by the power from the motor generator 27 or the electricity storage device 31. The revolving electric motor 34 is configured of, for example, a three-phase induction motor, and is provided on the revolving frame 5 together with the revolving hydraulic motor 26. The revolving electric motor 34 drives the revolving device 3 in cooperation with the revolving hydraulic motor 26. Therefore, the revolving device 3 is driven by the compound torque of the revolving hydraulic motor 26 and the revolving electric motor 34 to drive and revolve the upper revolving structure 4.

The revolving electric motor 34 is connected to the DC buses 29A, 29B through a second inverter 35. The revolving electric motor 34 plays two roles of a power running operation of being driven/rotated by receiving the power from the electricity storage device 31 or the motor generator 27, and regeneration of storing power in the electricity storage device 31 by generating power with extra torque at the revolving braking. Therefore, the power from the motor generator 27 or the like is supplied through the DC buses 29A, 29B to the revolving electric motor 34 at the power running operation. Thereby, the revolving electric motor 34 generates rotational torque in response to an operation of the revolving operation device 10 to assist in a drive of the revolving hydraulic motor 26, and drive the revolving device 3 to perform a revolving operation of the upper revolving structure 4.

The second inverter 35 is, as similar to the first inverter 28, configured using a plurality of switching elements. The on/off operation of each of the switching elements in the second inverter 35 is controlled by a revolving electric motor control unit 36 (hereinafter, referred to as "RMCU 36"). At the power running time of the revolving electric motor 34, the second inverter 35 converts the DC power of the DC buses 29A, 29B into AC power, which will be supplied to the revolving electric motor 34. At the regeneration time of the revolving electric motor 34, the second inverter 35 converts the AC power from the revolving electric motor 34 into DC power, which will be supplied to the electricity storage device 31, for example.

The RMCU 36 controls the on/off operation of each of the switching elements in the second inverter 35 based upon a revolving electric motor output command Per from the HCU 37. Thereby, the RMCU 36 controls regeneration power at the regeneration time of the revolving electric motor 34 and drive power at the power running time thereof. In addition, the RMCU 36 detects the generation power and the drive power of the revolving electric motor 34, and outputs them as a revolving electric motor output P0er to the HCU 37. The revolving electric motor output P0er is not limited to the power detected by the RMCU 36, but may be estimated (calculated) based upon, for example, the present revolving electric motor output command Per by the HCU 37.

The HCU 37 configures a controller together with, for example, the ECU 21, the MGCU 30, the RMCU 36 and the like to control the output of the engine 20 and the motor generator 27. The HCU 37 is configured of, for example, a microcomputer, and is connected electrically to the ECU 21, the MGCU 30, the RMCU 36 and the BCU 32 using a CAN 38 (controller area network). The HCU 37 exchanges communications with the ECU 21, the MGCU 30, the RMCU 36 and the BCU 32, while controlling the engine 20, the motor generator 27, the revolving electric motor 34 and the electricity storage device 31.

The battery temperature Tb, the hydraulic oil temperature To, the state of charge SOC, the current Ib, the voltage Vb, the revolving electric motor output P0er, other vehicle body information V1 and the like are inputted through the CAN 38 to the HCU 37. In addition, the operating amount sensors 9A to 11A are connected to the HCU 37. As a result, the lever operating amount OA including various kinds of operating amounts is inputted to the HCU 37. Further, the engine control dial 39 is connected to the HCU 37, and a target rotational speed we of the engine 20 set by the engine control dial 39 is inputted to the HCU 37.

The HCU 37 controls the output of the electricity storage device 31 based upon the state of charge SOC and the like. Here, the HCU 37 has a target value SOC0 as a reference value defined in the state of charge SOC. By referring to one example of the target value, the target value SOC0 of the state of charge SOC is 50%.

The engine control dial 39 is configured of a rotatable dial, and sets the target rotational speed ωe of the engine 20 in accordance with a rotational position of the dial. The engine control dial 39 is positioned in the cab 7 and is operated/rotated by an operator, outputting a command signal in accordance with the target rotational speed ωe.

Figure 4:
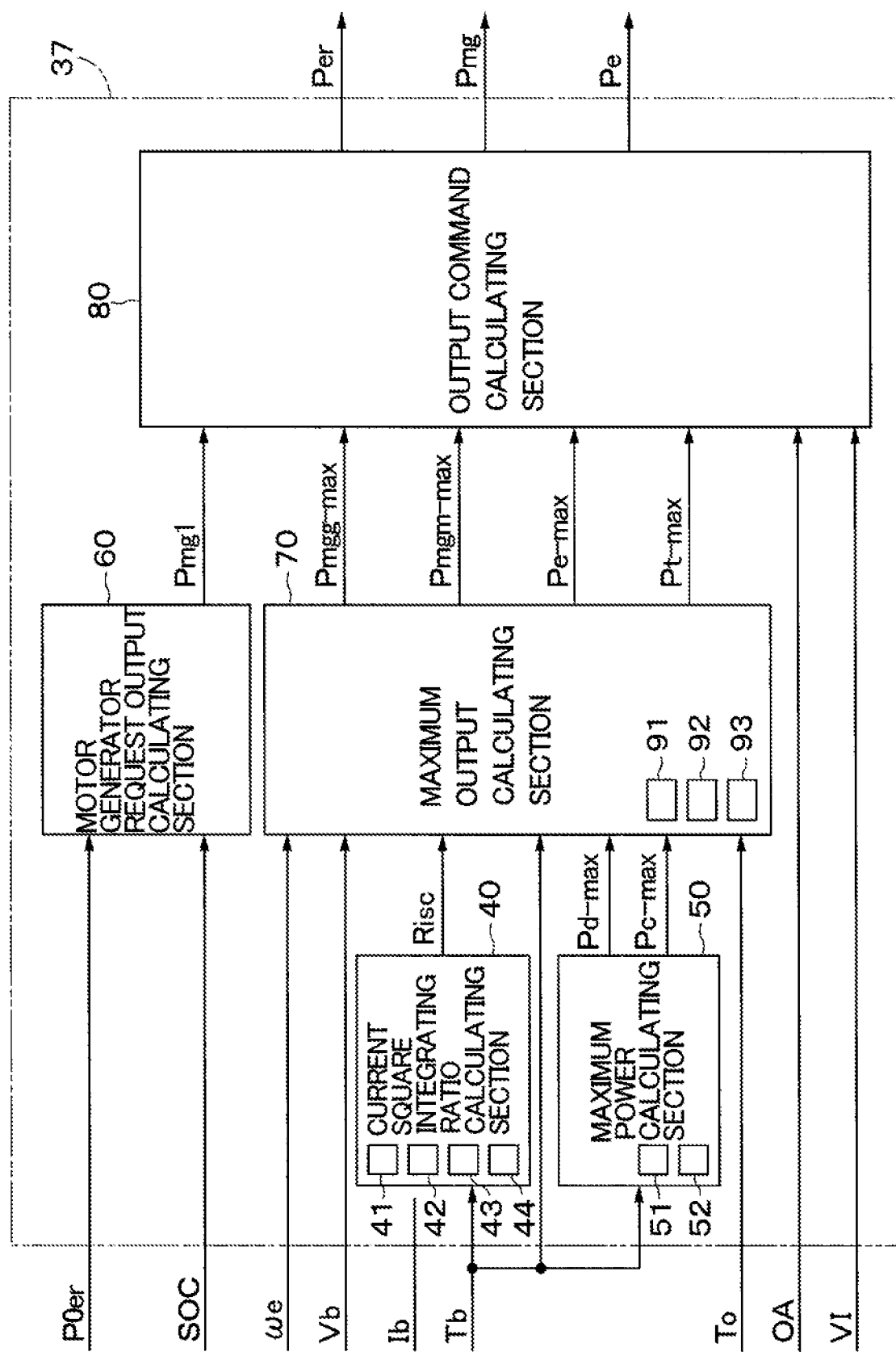
FIG. 4 is a block diagram showing a hybrid control unit according to the embodiment.

Next, an explanation will be made of a specific configuration of the HCU 37 with reference to FIG. 4. The HCU 37 includes a current square integrating ratio calculating section 40, a maximum power calculating section 50, a motor generator request output calculating part 60, a maximum output calculating section 70 and an output command calculating section 80.

Figure 5:
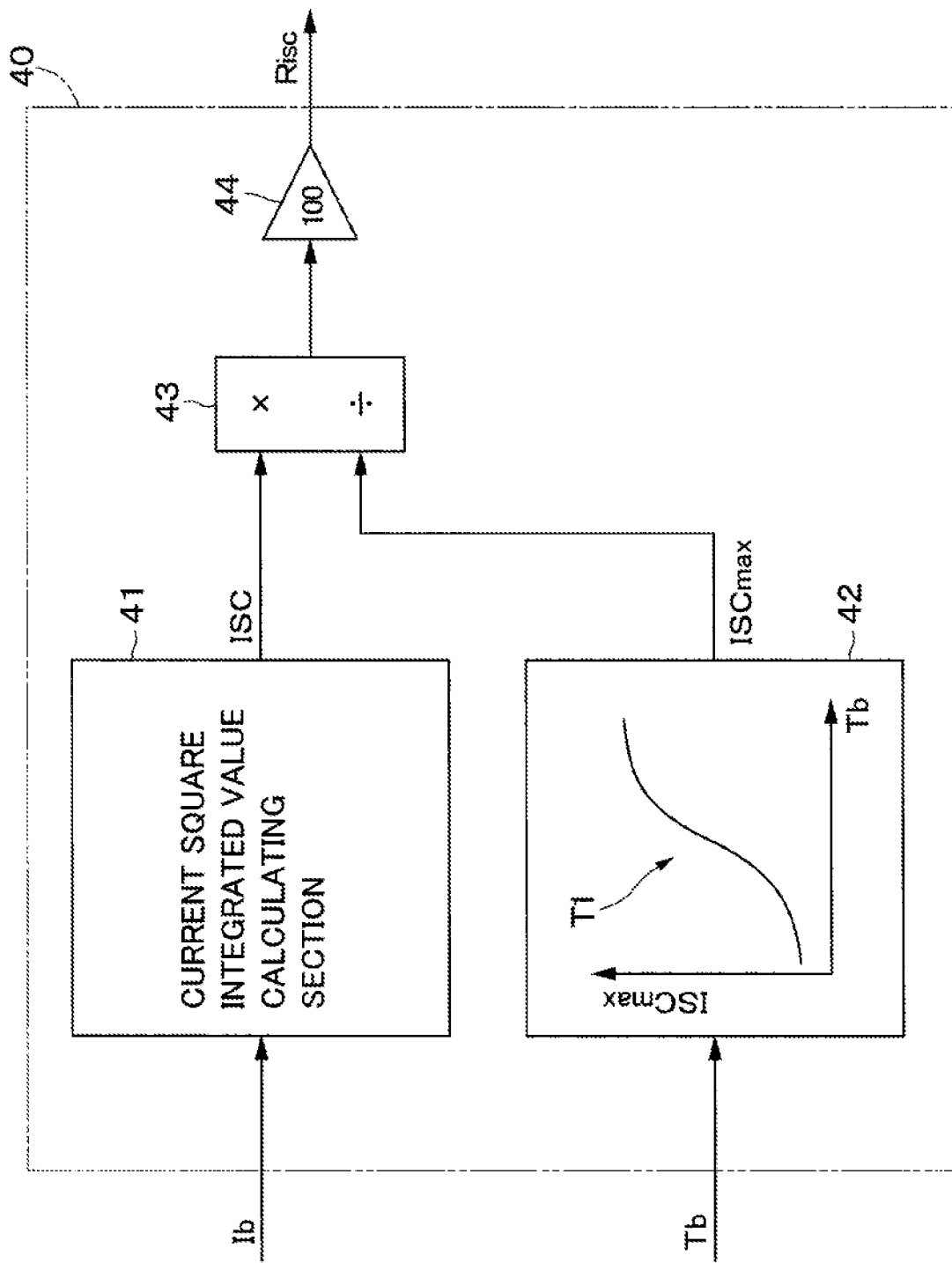
FIG. 5 is a block diagram showing a current square integrating ratio calculating section in FIG. 4.

First, an explanation will be made of a specific configuration of the current square integrating ratio calculating section 40 with reference to FIG. 5.

A current square integrated value ISC is generally used for an index of intensity of charge or discharge. The current square integrated value ISC is the index showing how much current is inputted or outputted for a constant time in the past traced back from the present time by integrating the square of current for T time. At this time, a plurality of time Ts are set in many cases. This index is optionally set according to a specification of the electricity storage device 31 or the like. Accordingly, when the electricity storage device 31 is used over an upper limit value ISCmax of the current square integrated value, the degradation of the electricity storage device 31 is accelerated. Therefore, the electricity storage device 31 is used not to go beyond the upper limit value ISCmax of the current square integrated value as much as possible. Hereinafter, an explanation will be made of a case where time T is set to 100 seconds as an example.

The current square integrating ratio calculating section 40 includes a current square integrated value calculating section 41, an upper limit value calculating part 42, a ratio calculating part 43 and a percentage conversion part 44. The current square integrated value calculating section 41 calculates the current square integrated value ISC of the electricity storage device 31 for a constant time T to the past from the present. Specifically, the current square integrated value calculating section 41 calculates the current square integrated value ISC for 100 seconds in the past based upon the current Ib outputted from the BCU 32.

The upper limit value calculating part 42 calculates the upper limit value ISCmax of the current square integrated value based upon the battery temperature Tb outputted from the battery temperature sensor 33. Specifically, the upper limit value calculating part 42 has, for example, a table T1 for calculating the upper limit value ISCmax of the current square integrated value based upon the battery temperature Tb. The table T1 gradually makes the upper limit value ISCmax small according to a reduction in the battery temperature Tb. Particularly in a low temperature state of approximately −20° C., the upper limit value ISCmax becomes an extremely small value. In this case, even when a slight current Ib is inputted or outputted, the current square integrated value ISC reaches the upper limit value ISCmax.

The ratio calculating part 43 divides the current square integrated value ISC by the upper limit value ISCmax to find a ratio of the present value and the upper limit value ISCmax of the current square integrated value ISC. The percentage conversion part 44 multiplies an output value from the ratio calculating part 43 by 100 to calculate a current square integrating ratio Risc converted into the percentage. At this time, use of the electricity storage device 31 is controlled such that the current square integrating ratio Risc does not go beyond 100%.

Figure 6:
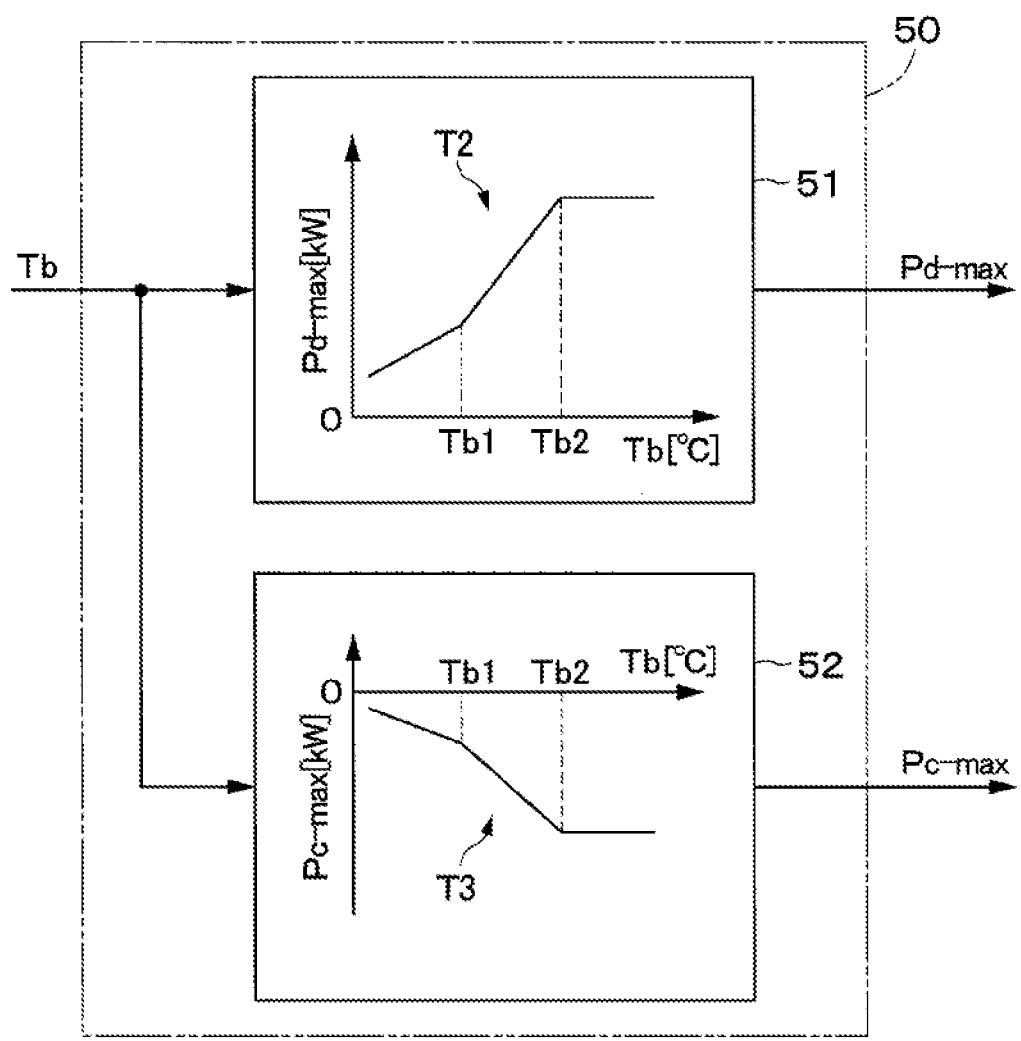
FIG. 6 is a block diagram showing a maximum power calculating section in FIG. 4.

An explanation will be made of a specific configuration of the maximum power calculating section 50 with reference to FIG. 6.

The maximum power calculating section 50 includes a maximum discharge power calculating section 51 and a maximum charge power calculating section 52. The maximum power calculating section 50 calculates maximum discharge power Pd-max and maximum charge power Pc-max based upon the battery temperature Tb.

The maximum discharge power calculating section 51 configures a discharge power maximum value adjusting part. When it is determined that the electricity storage device 31 is in a low temperature state based upon the battery temperature Tb, the maximum discharge power calculating section 51 makes the maximum discharge power Pd-max smaller as the battery temperature Tb is made lower. Specifically, when the battery temperature Tb is lower than a normal temperature Tb2 (for example, Tb2=25° C.) (Tb<Tb2), the maximum discharge power calculating section 51 determines that the electricity storage device 31 is in the low temperature state. The maximum discharge power calculating section 51 has, for example, a maximum discharge power table T2 for calculating the maximum discharge power Pd-max based upon the battery temperature Tb. When the battery temperature Tb is lower than the normal temperature Tb2, the table T2 gradually reduces the maximum discharge power Pd-max in a range of preventing over discharge, according to a reduction in the battery temperature Tb. It should be noted that the temperature (normal temperature Tb2) for determining the low temperature state is not limited to the aforementioned value, but is optionally set according to a specification of the electricity storage device 31 or the like.

The maximum charge power calculating section 52 configures a charge power maximum value adjusting part. When it is determined that the electricity storage device 31 is in a low temperature state based upon the battery temperature Tb, the maximum charge power calculating section 52 makes the maximum charge power Pc-max smaller as the battery temperature Tb is made lower. Specifically, when the battery temperature Tb is lower than the normal temperature Tb2 (Tb<Tb2), the maximum charge power calculating section 52 determines that the electricity storage device 31 is in the low temperature state. The maximum charge power calculating section 52 has, for example, a maximum charge power table T3 for calculating the maximum charge power Pc-max based upon the battery temperature Tb. When the battery temperature Tb is lower than the normal temperature Tb2, the table T3 gradually reduces the maximum charge power Pc-max in a range of preventing over charge, according to a reduction in the battery temperature Tb. At this time, the maximum charge power Pc-max is a minus value. Therefore, the table T3 gradually makes an absolute value of the maximum charge power Pc-max small according to a reduction in battery temperature Tb.

At this time, the tables T2, T3 are set such that the absolute of the maximum charge power Pc-max is made smaller than that of the maximum discharge power Pd-max. Thereby, since the power running operation of the motor generator 27 is to be prioritized, the rapid variation in a hydraulic load is allowable.

Figure 7:
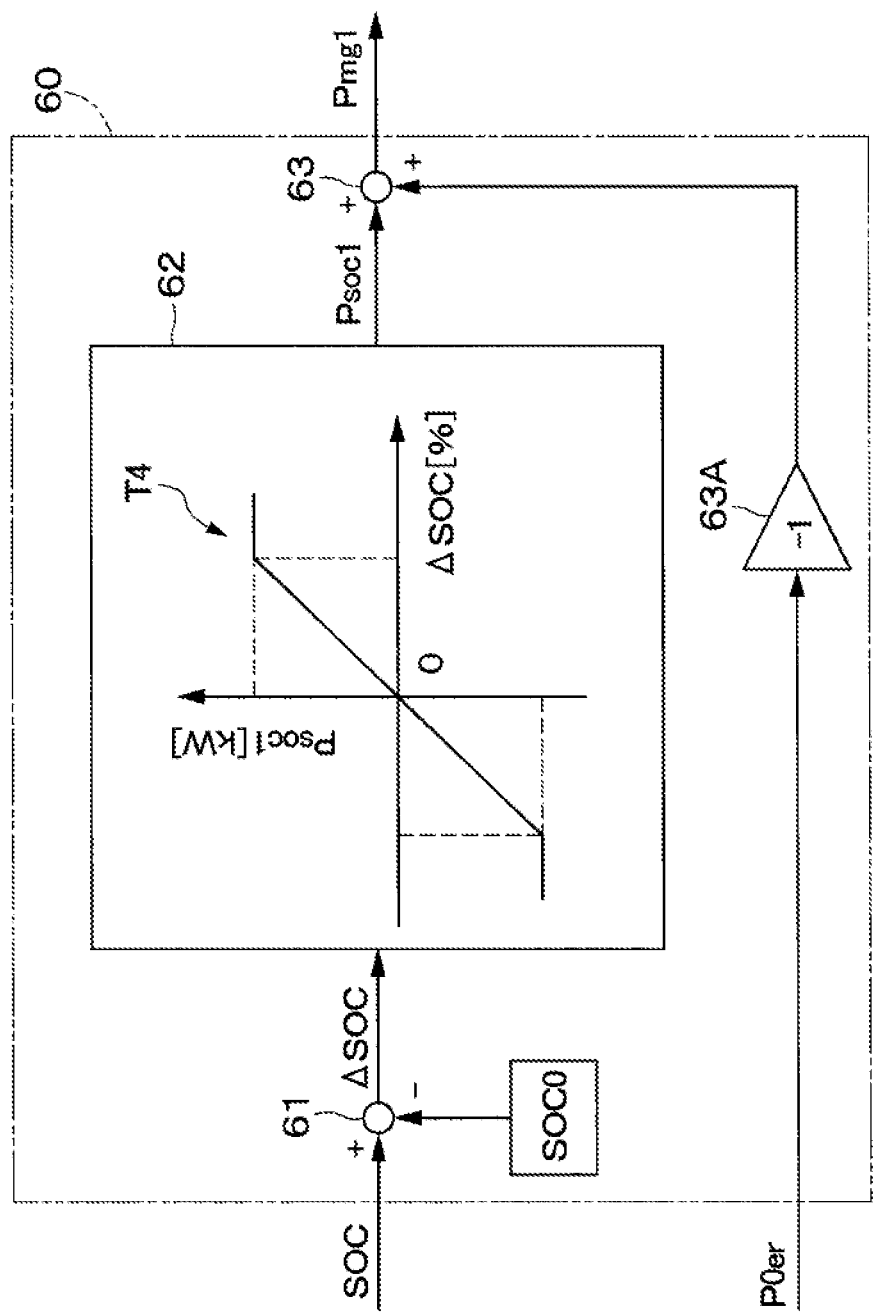
FIG. 7 is a block diagram showing a motor generator request output calculating part in FIG. 4.

Next, an explanation will be made of a specific configuration of the motor generator request output calculating part 60 with reference to FIG. 7.

The motor generator request output calculating part 60 determines motor generator request output Pmg1 for appropriately operating (performing a power running operation or a power generation operation of) the motor generator 27 according to a situation of the electricity storage device 31. The motor generator request output calculating part 60 requires power generation to the motor generator 27 when the state of charge goes below a target value SOC0 (SOC<SOC0) and requires power running to the motor generator 27 when the state of charge SOC goes beyond the target value SOC0 (SOC>SOC0). It should be noted that the target value SOC0 may be in advance set or an operator may optionally set the target value SOC0 using various types of input devices.

The motor generator request output calculating part 60 includes a state of charge deviation calculating part 61, a state of charge request output calculating part 62 and an adder 63. The state of charge SOC and the revolving electric motor output P0er are inputted to the motor generator request output calculating part 60.

The state of charge deviation calculating part 61 calculates a difference between the state of charge SOC and the target value SOC0 as a target state of charge setting value and outputs a state of charge ΔSOC (ΔSOC=SOC−SOC0).

The state of charge request output calculating part 62 outputs state of charge request output Psoc1 as output required for the motor generator 27 in accordance with the state of charge SOC. Specifically, the state of charge request output calculating part 62 has, for example, a table T4 for calculating the state of charge request output Psoc1 based upon the state of charge ΔSOC.

When the state of charge ΔSOC is equal to 0 (ΔSOC=0), the table T4 sets the state of charge request output Psoc1 to a minimum value (for example, Psoc1=0 kW). At this time, the state of charge SOC is equal to the target value SOC0, and the operation of the motor generator 27 in accordance with the state of charge SOC is unnecessary.

In a case where the state of charge ΔSOC is equal to a minus value (ΔSOC<0), the table T4 sets the state of charge request output Psoc1 as the power generation request in accordance with a magnitude of an absolute value of the state of charge ΔSOC. On the other hand, in a case where the state of charge ΔSOC is equal to a plus value (ΔSOC>0), the table T4 sets the state of charge request output Psoc1 as the power running request in accordance with a magnitude of the absolute value of the state of charge ΔSOC.

The state of charge request output Psoc1 based upon the state of charge SOC of the electricity storage device 31 and a value (−P0er) reversed in a sign of the revolving electric motor output P0er by a reversing input part 63A are inputted in the adder 63. The adder 63 adds a value acquired by multiplying the revolving electric motor output P0er by −1 to the state of charge request output Psoc1 and calculates this additional value. The power generation request and the power running request are preferentially executed according to the revolving electric motor output P0er. The adder 63 executes the process in consideration of this point.

By referring to a specific explanation thereof, in a case where the state of charge request output Psoc1 is in the power running request and the revolving electric motor 34 is in the power running state, the state of charge request output Psoc1 as the discharge power is lowered by the value according to the revolving electric motor output P0er. In a case where the state of charge request output Psoc1 is in the power generation request and the revolving electric motor 34 is in the power generation state, the state of charge request output Psoc1 as the power generation power is lowered by the value according to the revolving electric motor output P0er.

On the other hand, in a case where the state of charge request output Psoc1 is in the power running request and the revolving electric motor 34 is in the power generation state, the state of charge request output Psoc1 as the discharge power increases by the value according to the revolving electric motor output P0er. In a case where the state of charge request output Psoc1 is in the power generation request and the revolving electric motor 34 is in the power running state, the state of charge request output Psoc1 as the power generation power increases by the value according to the revolving electric motor output P0er.

The adder 63 sets the motor generator request output Pmg1 to the additional value (Psoc1−P0er) (Pmg1=Psoc1−P0er). However, when the additional value in the power running side goes beyond the maximum power running output, the adder 63 sets the motor generator request output Pmg1 to the maximum power running output. When the additional value in the power generation side goes beyond the maximum power generation output, the adder 63 sets the motor generator request output Pmg1 to the maximum power generation output. The adder 63 outputs the motor generator request output Pmg1 in consideration of the revolving electric motor output P0er.

Next, an explanation will be made of a specific configuration of the maximum output calculating section 70 with reference to FIG. 8 to FIG. 12.

Figure 8:
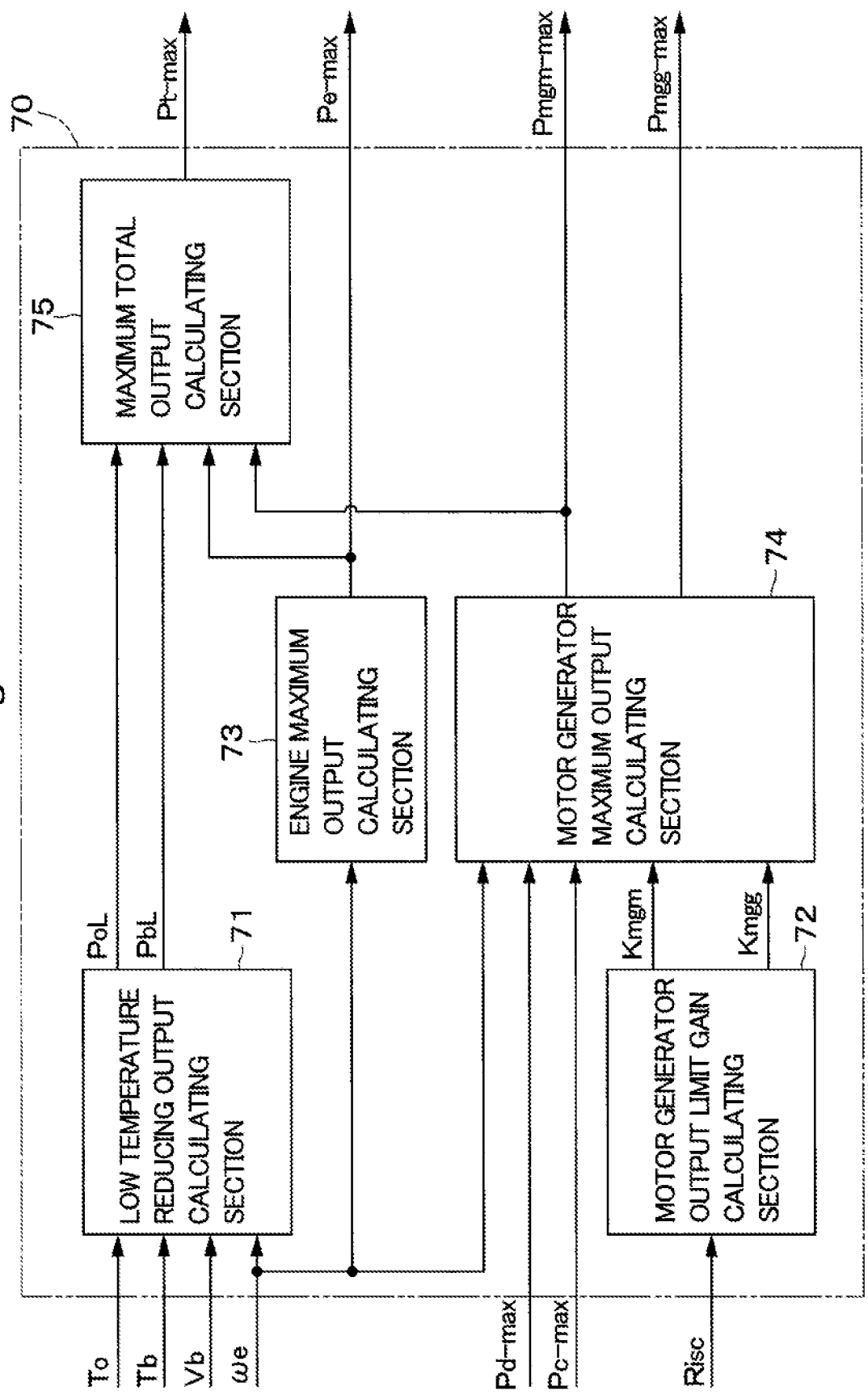
FIG. 8 is a block diagram showing a maximum output calculating section in FIG. 4.

As shown in FIG. 8, the maximum output calculating section 70 includes a low temperature reducing output calculating section 71, a motor generator output limit gain calculating section 72, an engine maximum power calculating section 73, a motor generator maximum output calculating section 74 and a maximum total power calculating section 75. A hydraulic oil temperature To, a battery temperature Tb, a voltage Vb, an engine target rotational speed ωe, a maximum discharge power Pd-max, a maximum charge power Pc-max and a current square integrating ratio Risc are inputted in the maximum output calculating section 70.

Figure 9:
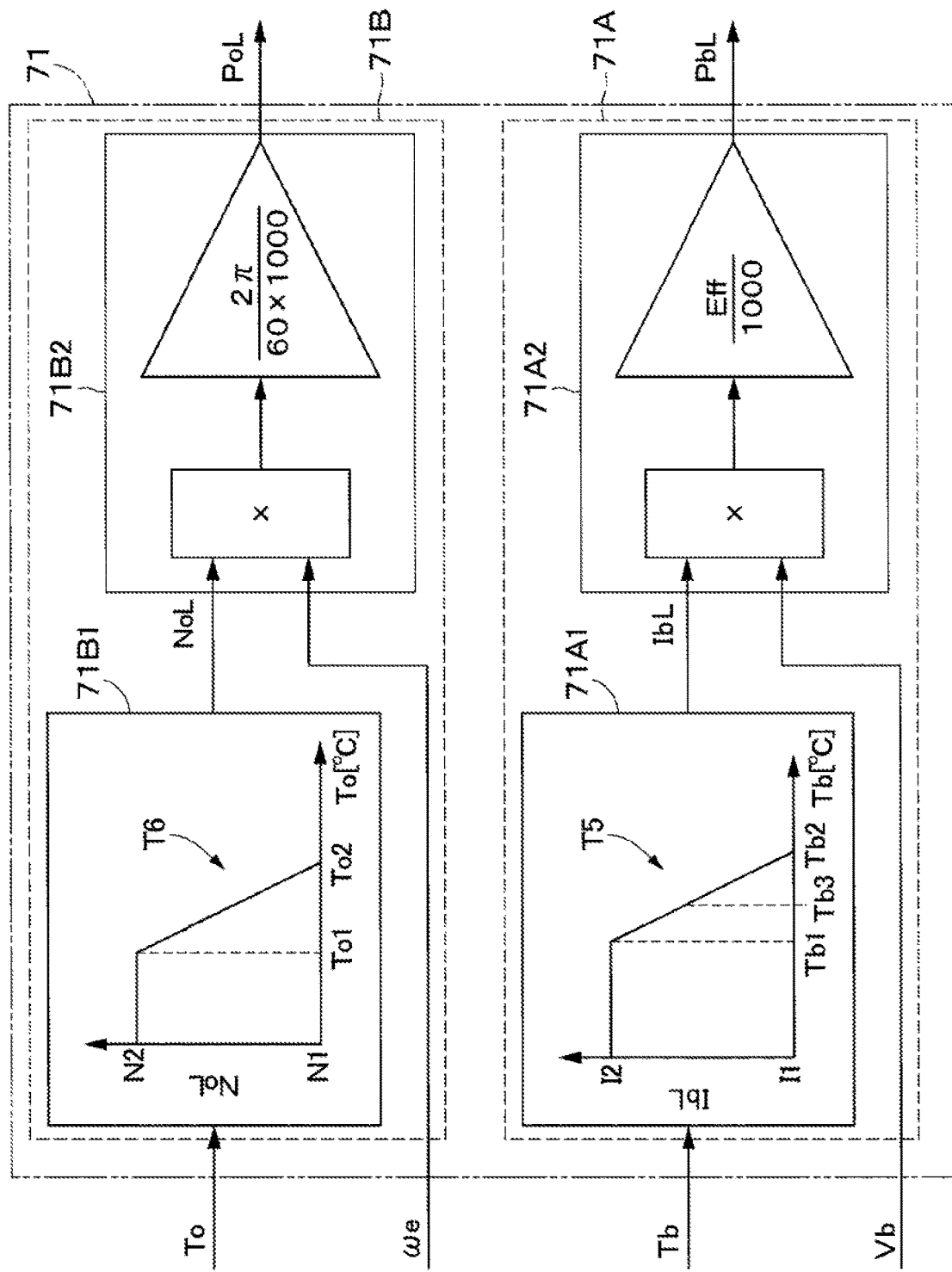
FIG. 9 is a block diagram showing a low temperature reducing output calculating section in FIG. 8.

As shown in FIG. 9, the low temperature reducing output calculating section 71 includes a battery low temperature reducing output calculating section 71A as a First vehicle body speed reduction amount determining section, and a hydraulic oil low temperature reducing output calculating section 71B as a second vehicle body speed reduction amount determining section.

The battery low temperature reducing output calculating section 71A calculates a battery low temperature reducing output PbL as a first vehicle body speed reduction amount based upon a battery temperature Tb and a voltage Vb. When it is determined that the electricity storage device 31 is in the low temperature state by the battery temperature Tb detected by the battery temperature sensor 33, the battery low temperature reducing output calculating section 71A determines a battery low temperature reducing output PbL a value of which is the larger as the battery temperature Tb is lower. Specifically, when the battery temperature Tb is lower than the normal temperature Tb2 (Tb<Tb2), the battery low temperature reducing output calculating section 71A determines that the electricity storage device 31 is in the low temperature state.

The battery low temperature reducing output calculating section 71A includes a battery low temperature reducing current calculating part 71A1, and an output conversion part 71A2. The battery low temperature reducing current calculating part 71A1 has a table T5 for calculating a battery reducing current IbL based upon a battery temperature Tb. The table T5 calculates the battery reducing current IbL from a lowest temperature Tb1 [° C.] on a specification at the vehicle body use over a normal temperature Tb2 [° C.]. The table T5 is produced based upon a maximum discharge current at the time of a temperature Tb3 [° C.] between the lowest temperature Tb1 and the normal temperature Tb2 (Tb1≤Tb3≤Tb2), and an upper limit value ISCmax of the current square integrated value at the normal temperature Tb2. Specifically, the table T5 is produced based upon a difference between a smaller one of the maximum discharge current of the electricity storage device 31 at the temperature Tb3 and a value by finding the square root of a value by dividing the upper limit value ISCmax of the current square integrated value at the normal temperature Tb2 by integration time T, and an upper limit value of a current effective value at the temperature Tb3. At this time, when the upper limit value of the current effective value is lowered according to a reduction in the battery temperature Tb, the battery reducing current IbL limits the current Ib of the electricity storage device 31 according to the reduction amount of the upper limit value.

Therefore, the table T5 sets the battery reducing current IbL (limit value of the current Ib) to the minimum value I1 (for example, I1=0 [A]) when the battery temperature Tb increases to or more than the normal temperature Tb2 (Tb≥Tb2). The table T5 sets the battery reducing current IbL to a maximum value I2 when the battery temperature Tb lowers to be equal to or lower than the lowest temperature Tb1 (Tb≤Tb1). When the battery temperature Tb is a value between the normal temperature Tb2 and the lowest temperature Tb1 (Tb1<Tb<Tb2), the table T5 increases the battery reducing current IbL from the minimum value I1 as the battery temperature Tb is lower. That is, when the battery temperature Tb is lower than the normal temperature Tb2, the table T5 sets the battery reducing current IbL to a value between the minimum value I1 and the maximum value I2 corresponding to a lowering degree from the normal temperature Tb2. Here, the normal temperature Tb2 and the lowest temperature Tb1 are in advance determined according to a specification at the vehicle body use or the like. For example, the normal temperature Tb2 is set to 25° C., and the lowest temperature Tb1 is set to −20° C.

The output conversion part 71A2 multiplies the battery reducing current IbL outputted from the battery low temperature reducing current calculating part 71A1 by a voltage Vb of the electricity storage device 31 and a specified coefficient (efficient Eff/1000) to acquire a dimension of the output. Consequently, the output conversion part 71A2 calculates a battery low temperature reducing output PbL [kW] in accordance with the battery temperature Tb.

The hydraulic oil low temperature reducing output calculating section 71B calculates a hydraulic oil low temperature reducing output PoL as a second vehicle body speed reduction amount based upon a hydraulic oil temperature To and an engine target rotational speed ωe. When it is determined that the hydraulic oil is in the low temperature state by the hydraulic oil temperature To detected by the hydraulic oil temperature sensor 23, the hydraulic oil low temperature reducing output calculating section 71B determines a hydraulic oil low temperature reducing output PoL a value of which is the larger as the hydraulic oil temperature To is lower. Specifically, when the hydraulic oil temperature To is lower than the normal temperature To2 (To<To2), the hydraulic oil low temperature reducing output calculating section 71B determines that the hydraulic oil is in the low temperature state.

The hydraulic oil low temperature reducing output calculating section 71B includes a hydraulic oil low temperature reducing torque calculating part 71B1, and an output conversion part 71B2. The hydraulic oil low temperature reducing torque calculating part 71B1 has a table T6 for calculating a hydraulic oil reducing torque NoL based upon a hydraulic oil temperature To. The table T6 is produced based upon a drag torque at the time of a temperature To3 [° C.] between the lowest temperature To1 and the normal temperature To2 (To1≤To3≤To2) and a drag torque at the normal temperature To2. The table T6 has a drag torque at the normal temperature To2 as a reference value, and is produced based upon an increasing amount of a drag torque at the temperature To3 to the reference value. At this time, the hydraulic oil reducing torque NoL limits the output torque of the hydraulic equipment device in accordance with the increasing amount of the drag torque at the time the drag torque increases following a reduction in the hydraulic oil temperature To.

Therefore, the table T6 sets the hydraulic oil reducing torque NoL (limit value of the torque) to a minimum value N1 (for example, N1=0 Nm) when the hydraulic oil temperature To increases to or more than the normal temperature To2 (To≥To2). The table T6 sets the hydraulic oil reducing torque NoL to a maximum value N2 when the hydraulic oil temperature To lowers to be equal to or lower than the lowest temperature To1 (To To1) as a threshold value. When the hydraulic oil temperature To is a value between the normal temperature To2 and the lowest temperature To1 (To1<To<To2), the table T6 increases the hydraulic oil reducing torque NoL from the minimum value N1 as the hydraulic oil temperature To is lower. That is, when the hydraulic oil temperature To is lower than the normal temperature To2, the table T6 sets the hydraulic oil reducing torque NoL to a value between the minimum value N1 and the maximum value N2 corresponding to a lowering degree from the normal temperature To2. Here, the normal temperature To2 and the lowest temperature To1 are in advance determined according to a specification at the vehicle body use or the like. For example, the normal temperature To2 is set to the same value as the normal temperature Tb2, and the lowest temperature To1 is set to the same value as the lowest temperature Tb1. However, the normal temperature To2 may be a value different from the normal temperature Tb2. Likewise, the lowest temperature To1 may be a value different from the lowest temperature Tb1.

The output conversion part 71B2 multiplies the hydraulic oil reducing torque NoL outputted from the hydraulic oil low temperature reducing torque calculating part 71B1 by an engine target rotational speed ωe [rpm] and a specified coefficient (2π/60/1000) to acquire a dimension of the output. Consequently, the output conversion part 71B2 calculates a hydraulic oil low temperature reducing output PoL [kW] in accordance with the hydraulic oil temperature To.

Figure 10:
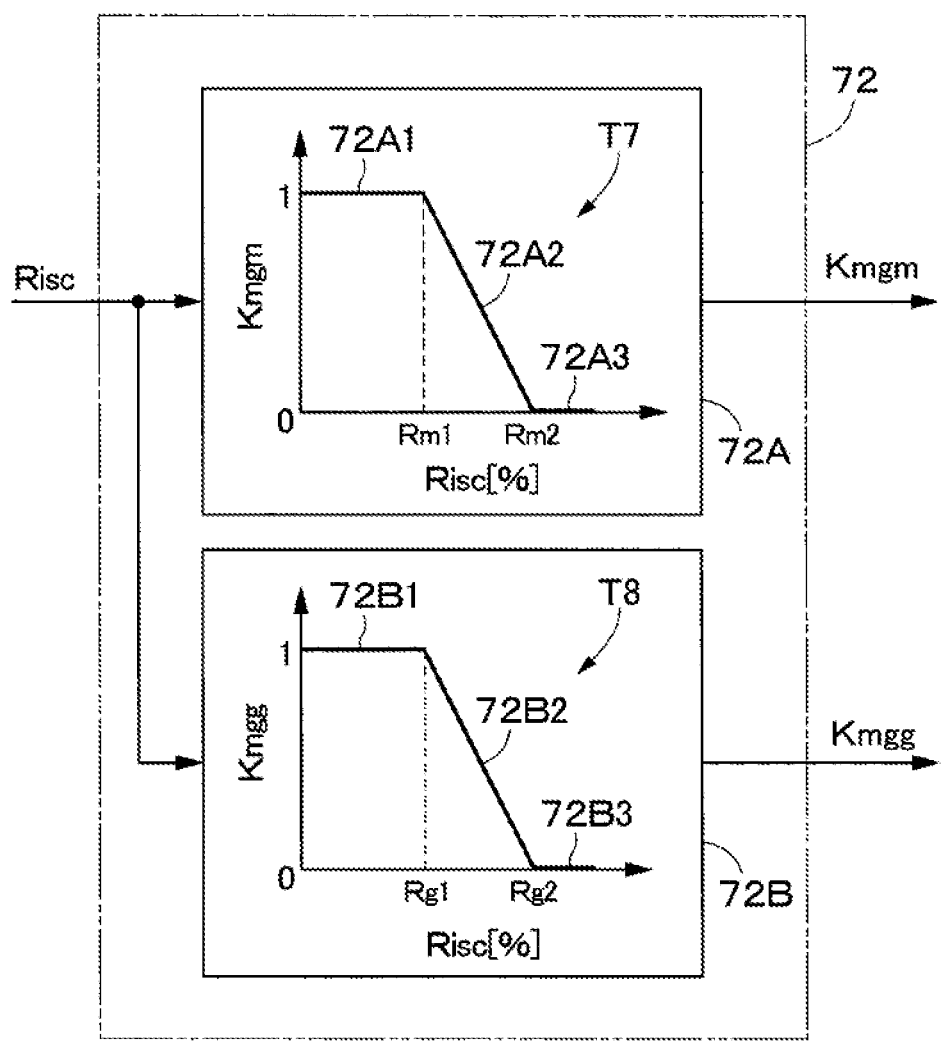
FIG. 10 is a block diagram showing a motor generator output limit gain calculating section in FIG. 8.

As shown in FIG. 10, the motor generator output limit gain calculating section 72 includes a power running limit gain calculating section 72A, and a power generation limit gain calculating section 72B. The current square integrating ratio Risc is inputted to the motor generator output limit gain calculating section 72.

The power running limit gain calculating section 72A has a table T7 for calculating a power running limit gain Kmgm based upon the current square integrating ratio Risc. At this time, the power running limit gain Kmgm limits a power running output of the motor generator 27 for suppressing the current square integrating ratio Risc from increasing until an upper limit value Rm2 by the power running operation of the motor generator 27. The power running limit gain calculating section 72A uses the table T7 to calculate the power running limit gain Kmgm in accordance with the current square integrating ratio Risc. It should be noted that the upper limit value Rm2 is a third reference value, and, for example, is 100%.

The table T7 sets the power running limit gain Kmgm to a minimum value (for example, Kmgm=0) when the current square integrating ratio Risc increases to the upper limit value Rm2 (Risc≥Rm2). The table T7 sets the power running limit gain Kmgm to a maximum value (for example, Kmgm=1) when the current square integrating ratio Risc lowers to a proper reference value Rm1 (Risc≤Rm1) as a threshold value. In addition, when the current square integrating ratio Risc is a value between the upper limit value Rm2 and the proper reference value Rm1 (Rm1<Risc<Rm2), the table T7 decreases the power running limit gain Kmgm as the current square integrating ratio Risc increases. That is, when the current square integrating ratio Risc increases more than the proper reference value Rm1, the table T7 sets the power running limit gain Kmgm to a value between the minimum value and the maximum value corresponding to an increasing degree from the proper reference value Rm1. Here, the proper reference value Rm1 is set to a large value with a predetermined allowance from the upper limit value Rm2. For example, when the upper limit value Rm2 reaches 100%, the proper reference value Rm1 is set to a value of approximately 90%.

Accordingly the power running limit gain calculating section 72A includes a maximum gain setting part 72A1, a gain reducing setting part 72A2 and a minimum gain setting part 72A3. The maximum gain setting part 72A1 sets the power running limit gain Kmgm to a maximum value when the current square integrating ratio Risc is equal to or less than the proper reference value Rm1. When the current square integrating ratio Risc is in a range between the proper reference value Rm1 and the upper limit value Rm2, the gain reducing setting part 72A2 decreases the power running limit gain Kmgm as the current square integrating ratio Risc is the larger. When the current square integrating ratio Risc is equal to or more than the upper limit value Rm2, the minimum gain setting part 72A3 sets the power running limit gain Kmgm to a minimum value.

A power generation limit gain calculating section 72B has a table T8 for calculating a power generation limit gain Kmgg based upon the current square integrating ratio Risc. At this time, the power generation limit gain Kmgg limits a power generation output of the motor generator 27 for suppressing the current square integrating ratio Risc from increasing until an upper limit value Rg2 by the power generation of the motor generator 27. The power generation limit gain calculating section 72B uses the table T8 to calculate the power generation limit gain Kmgg in accordance with the current square integrating ratio Risc. It should be noted that the upper limit value Rg2 is a second reference value, and, for example, is the same value as the upper limit value Rm2 (for example, Rg2=100%).

The table T8 sets the power generation limit gain Kmgg to a minimum value (for example, Kmgg=0) when the current square integrating ratio Risc increases to the upper limit value Rg2 (Risc≥Rg2). The table T8 sets the power generation limit gain Kmgg to a maximum value (for example, Kmgg=1) when the current square integrating ratio Risc decreases to or less than a proper reference value Rg1 (Risc≤Rg1) as a threshold value. In addition, when the current square integrating ratio Risc is a value between the upper limit value Rg2 and the proper reference value Rg1 (Rg1<Risc<Rg2), the table T8 decreases the power generation limit gain Kmgg as the current square integrating ratio Risc increases. That is, when the current square integrating ratio Risc increases more than the proper reference value Rg1, the table T8 sets the power generation limit gain Kmgg to a value between the minimum value and the maximum value corresponding to an increasing degree from the proper reference value Rg1.

Accordingly the power generation limit gain calculating section 72B includes a maximum gain setting part 72B1, a gain reducing setting part 72B2 and a minimum gain setting part 72B3. The maximum gain setting part 72B1 sets the power generation limit gain Kmgg to a maximum value when the current square integrating ratio Risc is equal to or less than the proper reference value Rg1. When the current square integrating ratio Risc is in a range between the upper limit value Rg2 and the proper reference value Rg1, the gain reducing setting part 72B2 decreases the power generation limit gain Kmgg as the current square integrating ratio Risc is the larger. When the current square integrating ratio Risc is equal to or more than the upper limit value Rg2, the minimum gain setting part 72B3 sets the power generation limit gain Kmgg to a minimum value.

Here, the proper reference value Rg1 is set to a small value with a predetermined allowance from the upper limit value Rg2. For example, the proper reference value Rg1 is set to the same value as the proper reference value Rm1. Each of the proper reference values Rg1, Rm1 is used as the first reference value.

It should be noted that there is exemplified a case where the proper reference value Rg1 for power generation limit is the same value as the proper reference value Rm1 for power running limit, but these values may be different from each other. Likewise, the upper limit value Rg2 for power generation limit is the same value as the upper limit value Rm2 for power running limit, but these values may be different from each other.

The engine maximum power calculating section 73 has a table (not shown) showing a corresponding relation between an engine target rotational speed $\omega e$ and an engine maximum power Pe-max. At this time, the engine maximum power Pe-max shows a maximum output that can be supplied from the engine 20 when the engine 20 is driven in the engine target rotational speed $\omega e$. The engine maximum power calculating section 73 calculates the engine maximum power Pe-max based upon the engine target rotational speed $\omega e$, and outputs the calculated engine maximum power Pe-max.

Figure 11:
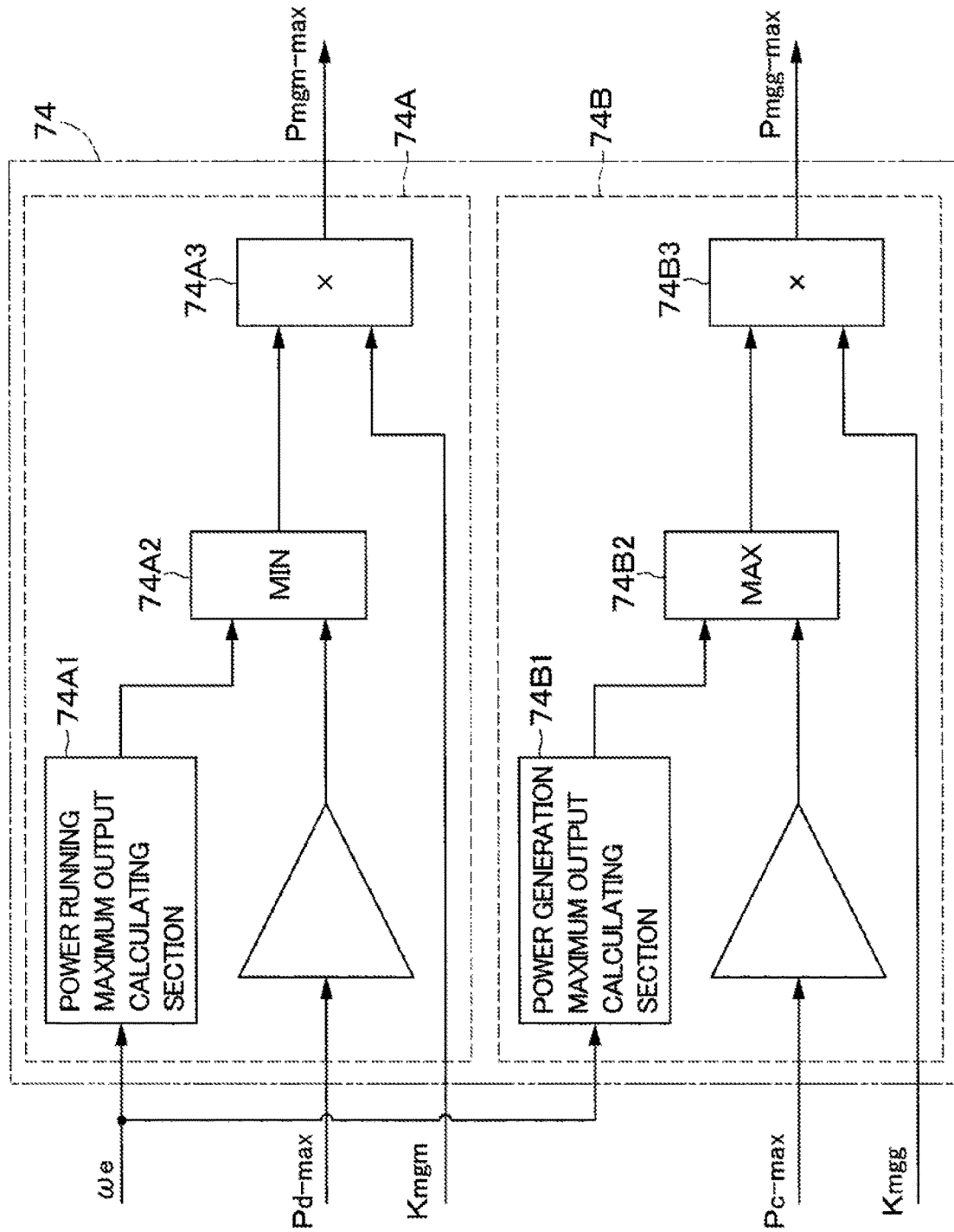
FIG. 11 is a block diagram showing a motor generator maximum output calculating section in FIG. 8.

As shown in FIG. 11, a motor generator maximum output calculating section 74 includes a motor generator maximum power running output calculating part 74A that calculates a motor generator maximum power running output Pmgm-max, and a motor generator maximum power generation output calculating part 74B that calculates a motor generator maximum power generation output Pmgg-max.

The motor generator maximum power running output calculating part 74A calculates the motor generator maximum power running output Pmgm-max based upon an engine target rotational speed $\omega e$, a maximum discharge power Pd-max and a power running limit gain Kmgm.

The motor generator maximum power running output calculating part 74A includes a power running maximum output calculating section 74A1, a minimum value selecting part 74A2 and a multiplication part 74A3. The power running maximum output calculating section 74A1, as similar to the engine maximum power calculating section 73, has a table (not shown) that calculates a power running maximum output of the motor generator 27 to the engine target rotational speed ωe. The power running maximum output calculating section 74A1 calculates the power running maximum output of the motor generator 27 based upon the target rotational speed ωe of the engine 20.

The minimum value selecting part 74A2 compares the power running maximum output determined from the target rotational speed ωe with a value acquired by multiplying the maximum discharge power Pd-max of the electricity storage device 31 by efficiency of each of the inverter 28 and the motor generator 27 to select a minimum value of these.

The multiplication part 74A3 multiplies the minimum value selected by the minimum value selecting part 74A2 by the power running limit gain Kmgm, and outputs the multiplied value as the motor generator maximum power running output Pmgm-max. At this time, the motor generator maximum power running output Pmgm-max is equivalent to the discharge power maximum value of the electricity storage device 31.

At this time, the motor generator maximum power running output calculating part 74A and the minimum gain setting part 72A3 configure a discharge power maximum value reduction section 92. In a case where the current square integrating ratio Risc goes beyond the upper limit value Rm2 as a value larger than the predetermined proper reference value Rm1 (Risc≥Rm2), the discharge power maximum value reduction section 92 makes the motor generator maximum power running output Pmgm-max further smaller as compared to a case where the current square integrating ratio Risc is smaller than the upper limit value Rm2.

In addition, the motor generator maximum power generation output calculating part 74B calculates the motor generator maximum power generation output Pmgg-max based upon the engine target rotational speed ωe, the maximum charge power Pc-max and the power generation limit gain Kmgg.

The motor generator maximum power generation output calculating part 74B includes a power generation maximum output calculating section 74B1, a maximum value selecting part 74B2 and a multiplication part 74B3. The power generation maximum output calculating section 74B1, as similar to the engine maximum power calculating section 73, has a table (not shown) that calculates a power generation maximum output of the motor generator 27 to the engine target rotational speed ωe. The power generation maximum output calculating section 74B1 calculates the power generation maximum output of the motor generator 27 based upon the target rotational speed ωe of the engine 20.

The maximum value selecting part 74B2 compares the power generation maximum output determined from the target rotational speed ωe with a value acquired by multiplying the maximum charge power Pc-max of the electricity storage device 31 by efficiency of each of the inverter 28 and the motor generator 27 to select a maximum value of these. At this time, since both of the power generation maximum output and the maximum charge power Pc-max are minus values, a smaller one in an absolute value thereof becomes the maximum value.

The multiplication part 74B3 multiplies the maximum value selected by the maximum value selecting part 74B2 by the power generation limit gain Kmgg, and outputs the multiplied value as the motor generator maximum power generation output Pmgg-max. At this time, the motor generator maximum power generation output Pmgg-max is equivalent to the charge power maximum value of the electricity storage device 31.

At this time, the motor generator maximum power generation output calculating part 74B and the minimum gain setting part 72B3 configure a Charge power maximum value reduction section 93. In a case where the current square integrating ratio Risc goes beyond the upper limit value Rg2 as a value larger than the predetermined proper reference value Rg1 (Risc≥Rg2), the Charge power maximum value reduction section 93 makes the motor generator maximum power generation output Pmgg-max smaller as compared to a case where the current square integrating ratio Risc is smaller than the upper limit value Rg2.

Figure 12:
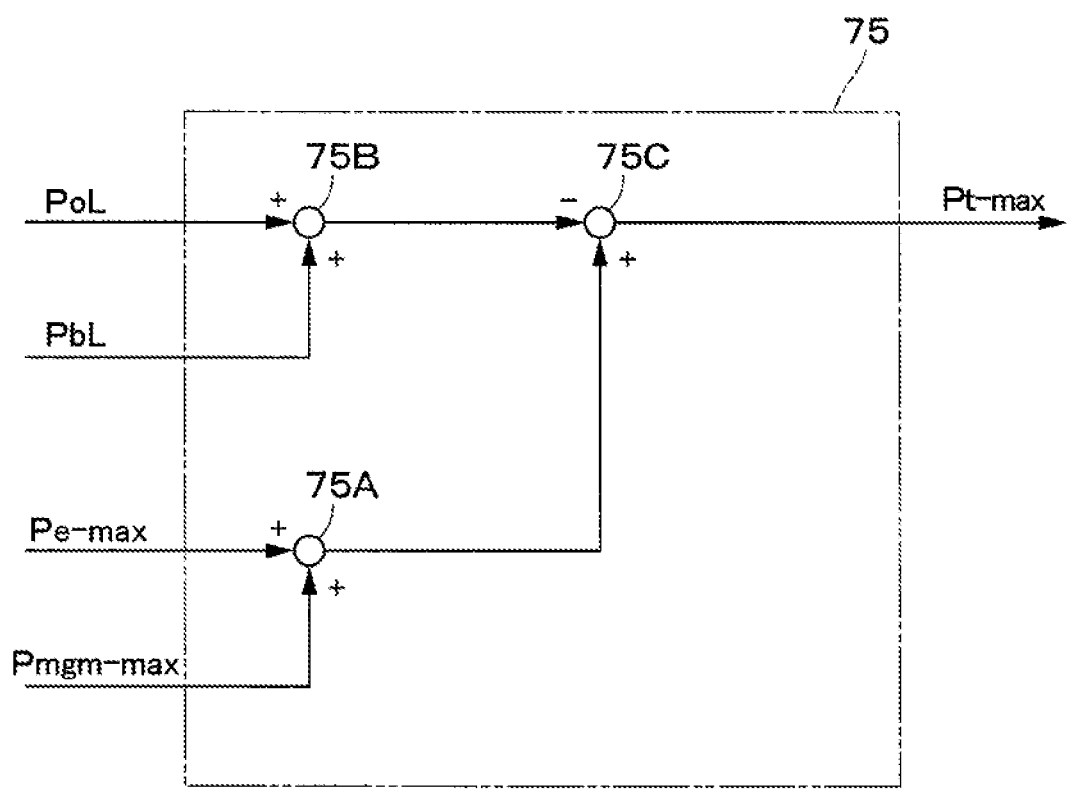
FIG. 12 is a block diagram showing a maximum total power calculating section in FIG. 8.

As shown in FIG. 12, the maximum total power calculating section 75 includes adders 75A, 75B, and a subtractor 75C. The adder 75A calculates a maximum output additional value (Pe-max+Pmgm-max) as a sum of the engine maximum power Pe-max and the motor generator maximum power running output Pmgm-max. The adder 75B calculates a reducing output additional value (PoL+PbL) as a sum of the hydraulic oil low temperature reducing output PoL and the battery low temperature reducing output PbL. The subtractor 75C subtracts the reducing output additional value (PoL+PbL) from the maximum output additional value (Pe-max+Pmgm-max). Consequently, the maximum total power calculating section 75 calculates, as shown in the following Formula 1, a subtracted value acquired by subtracting the reducing output additional value from the maximum output additional value, as a maximum total power Pt-max.

$$Pt\text{-max} = (Pe\text{-max} + Pmgm\text{-max}) - (PoL + PbL)$$ [Formula 1]

At this time, the maximum total power calculating section 75, the motor generator maximum power running output calculating part 74A and the gain reducing setting part 72A2 configure a vehicle body speed reduction amount adjusting section 91. In a case where the current square integrating ratio Risc goes beyond the predetermined proper reference value Rm1 (Risc Rm1), the vehicle body speed reduction amount adjusting section 91 makes the vehicle body speed smaller than the battery low temperature reducing output PbL as the exceeded amount is the larger.

Figure 13:
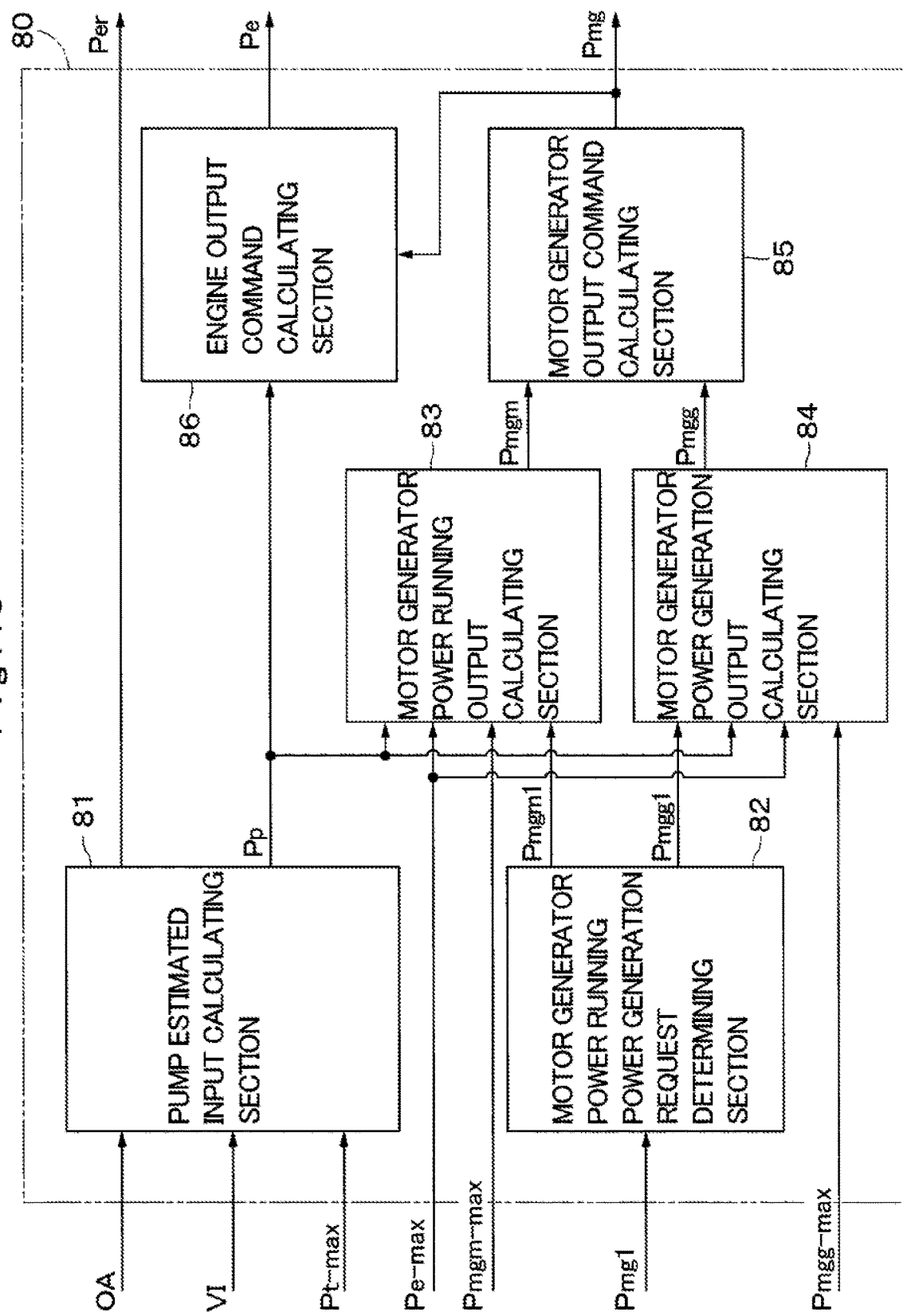
FIG. 13 is a block diagram showing an output command calculating section in FIG. 4.

Next, an explanation will be made of a specific configuration of the output command calculating section 80 with reference to FIG. 13.

The output command calculating section 80 configures a vehicle body operation control part. The output command calculating section 80 controls a vehicle body operation based upon a sum of the battery low temperature reducing output PbL and the hydraulic oil low temperature reducing output PoL. Here, the output command calculating section 80 controls the motor generator 27 such that the charge power does not exceed the maximum charge power Pc-max. In addition, the output command calculating section 80 controls the motor generator 27 such that the discharge power does not exceed the maximum discharge power Pd-max.

The output command calculating section 80 includes a pump estimated input calculating section 81, a motor generator power running power generation request determining section 82, a motor generator power running output calculating section 83, a motor generator power generation output calculating section 84, a motor generator output command calculating section 85 and an engine output command calculating section 86. Each lever operating amount OA, the other vehicle body information VI, the maximum total power Pt-max, the motor generator request output Pmg1, the engine maximum power Pe-max, the motor generator maximum power running output Pmgm-max and the motor generator maximum power generation output Pmgg-max are inputted to the output command calculating section 80.

The pump estimated input calculating section 81 calculates a pump estimated input Pp and a revolving electric motor output command Per required for operating the vehicle body in accordance with each lever operating amount OA. The pump estimated input calculating section 81 considers the other vehicle body information VI and the maximum total power Pt-max at the time of calculating the pump estimated input Pp and the revolving electric motor output command Per. Therefore, the other vehicle body information VI, each lever operating amount OA and the maximum total power Pt-max are inputted to the pump estimated input calculating section 81. The pump estimated input calculating section 81 estimates a pump output required for a target operation based upon each lever operating amount OA and the other vehicle body information VI. The pump estimated input calculating section 81 calculates a preliminary pump estimated input in consideration of a pump efficiency, an auxiliary device and the like with the pump output. At this time, the pump estimated input calculating section 81 also calculates the revolving electric motor output command Per for operating the revolving electric motor 34 in accordance with a revolving operating amount of each lever operating amount OA. Specifically, the pump estimated input calculating section 81 calculates the revolving electric motor output command Per in such a manner that the revolving electric motor 34 preferentially bears the output of the revolving operation more than the revolving hydraulic motor 26. Next, the pump estimated input calculating section 81 compares the maximum total power Pt-max with the preliminary pump estimated input, and outputs the smaller one as a final pump estimated input Pp. The calculation to be performed in the pump estimated input calculating section 81 corresponds to lowering the vehicle body speed in such a manner as to prevent the electricity storage device 31 from increasing the current square integrating ratio Risc in the low temperature state.

The motor generator request output Pmg1 is inputted to the motor generator power running power generation request determining section 82. In a case where the motor generator request output Pmg1 is a plus value (Pmg1>0), the motor generator power running power generation request determining section 82 sets the motor generator power running request output Pmgm1 to a value of the motor generator request output Pmg1 (Pmgm1=Pmg1), and sets the motor generator power generation request output Pmgg1 to 0 (Pmgg1=0). In reverse, in a case where the motor generator request output Pmg1 is a minus value (Pmg1<0), the motor generator power running power generation request determining section 82 sets the motor generator power running request output Pmgm1 to 0 (Pmgm1=0), and sets the motor generator power generation request output Pmgg1 to a value of the motor generator request output Pmg1 (Pmgm1=Pmg1). The motor generator power running power generation request determining section 82 outputs the motor generator power running request output Pmgm1 and the motor generator power generation request output Pmgg1.

The pump estimated input Pp, the engine maximum power Pe-max, the motor generator maximum power running output Pmgm-max and the motor generator power running request output Pmgm1 are inputted to the motor generator power running output calculating section 83. The motor generator power running output calculating section 83 compares the pump estimated input Pp with the engine maximum power Pe-max. In a case where the pump estimated input Pp is larger than the engine maximum power Pe-max (Pp>Pe-max), the motor generator power running output calculating section 83 defines a difference between the pump estimated input Pp and the engine maximum power Pe-max as the motor generator power running output command Pmgm. However, the motor generator power running output command Pmgm is adjusted not to be larger than the motor generator maximum power running output Pmgm-max.

On the other hand, in a case where the engine maximum power Pe-max is larger than the pump estimated input Pp (Pp<Pe-max), the motor generator power running output calculating section 83 selects the smallest one of the motor generator maximum power running output Pmgm-max and the motor generator power running request output Pmgm1, which is defined as the motor generator power running output command Pmgm.

As a result, the motor generator power running output calculating section 83 supplements the amount lacking in the output of the engine 20 to the hydraulic load, by the power running output of the motor generator 27. Based thereupon, the motor generator power running output calculating section 83 controls a power running operation of the motor generator 27 to meet the motor generator power running request output Pmgm1. Thereby, the motor generator 27 results in meeting the power running request as much as possible.

The pump estimated input Pp, the engine maximum power Pe-max, the motor generator maximum power generation output Pmgg-max and the motor generator power generation request output Pmgg1 are inputted to the motor generator power generation output calculating section 84.

In this way, the motor generator power generation output calculating section 84 compares the pump estimated input Pp with the engine maximum power Pe-max. In a case where the pump estimated input Pp is larger than the engine maximum power Pe-max (Pp>Pe-max), the motor generator power generation output calculating section 84 outputs the motor generator power generation output command Pmgg reduced to 0. In this case, since all the output of the engine 20 is consumed to respond to the hydraulic load, the engine 20 has no allowance to performing the power generation operation. Therefore, the motor generator power generation output command Pmgg is set to 0, and the motor generator 27 performs no power generation operation.

On the other hand, in a case where the engine maximum power Pe-max is larger than the pump estimated input Pp (Pp<Pe-max), the smallest one in an absolute value of a difference between the engine maximum power Pe-max and the pump estimated input Pp, the motor generator maximum power generation output Pmgg-max and the motor generator power generation request output Pmgg1 is selected, which is defined as the motor generator power generation output command Pmgg.

Consequently, the motor generator power generation output calculating section 84 controls the power generation operation of the motor generator 27 to meet the motor generator power generation request output Pmgg1 as much as possible while responding to the hydraulic load.

The motor generator output command calculating section 85 adds the motor generator power running output command Pmgm and the motor generator power generation output command Pmgg. The motor generator output command calculating section 85 outputs this additional value as the motor generator output command Pmg.

The engine output command calculating section 86 subtracts the motor generator output command Pmg from the pump estimated input Pp. The engine output command calculating section 86 outputs this subtracted value as the engine output command Pe.

The output command calculating section 80 controls the output of the electricity storage device 31 based upon the lever operating amounts OA detected by the operating amount sensors 9A to 11A in addition to the request of the output from the motor generator request output calculating part 60. In addition, the pump estimated input calculating section 81 in the output command calculating section 80 calculates the pump estimated input Pp in accordance with each lever operating amount OA. At this time, the motor generator power running output calculating section 83 in the output command calculating section 80 outputs the motor generator power running output command Pmgm on a priority basis of the securement of the pump estimated input Pp. Likewise, the motor generator power generation output calculating section 84 in the output command calculating section 80 outputs the motor generator power generation output command Pmgg on a priority basis of the securement of the pump estimated input Pp. Therefore, a reduction in a vehicle body speed is suppressed, making it possible to reduce the opportunity of giving operation stress or strange feelings to an operator.

Figure 14:
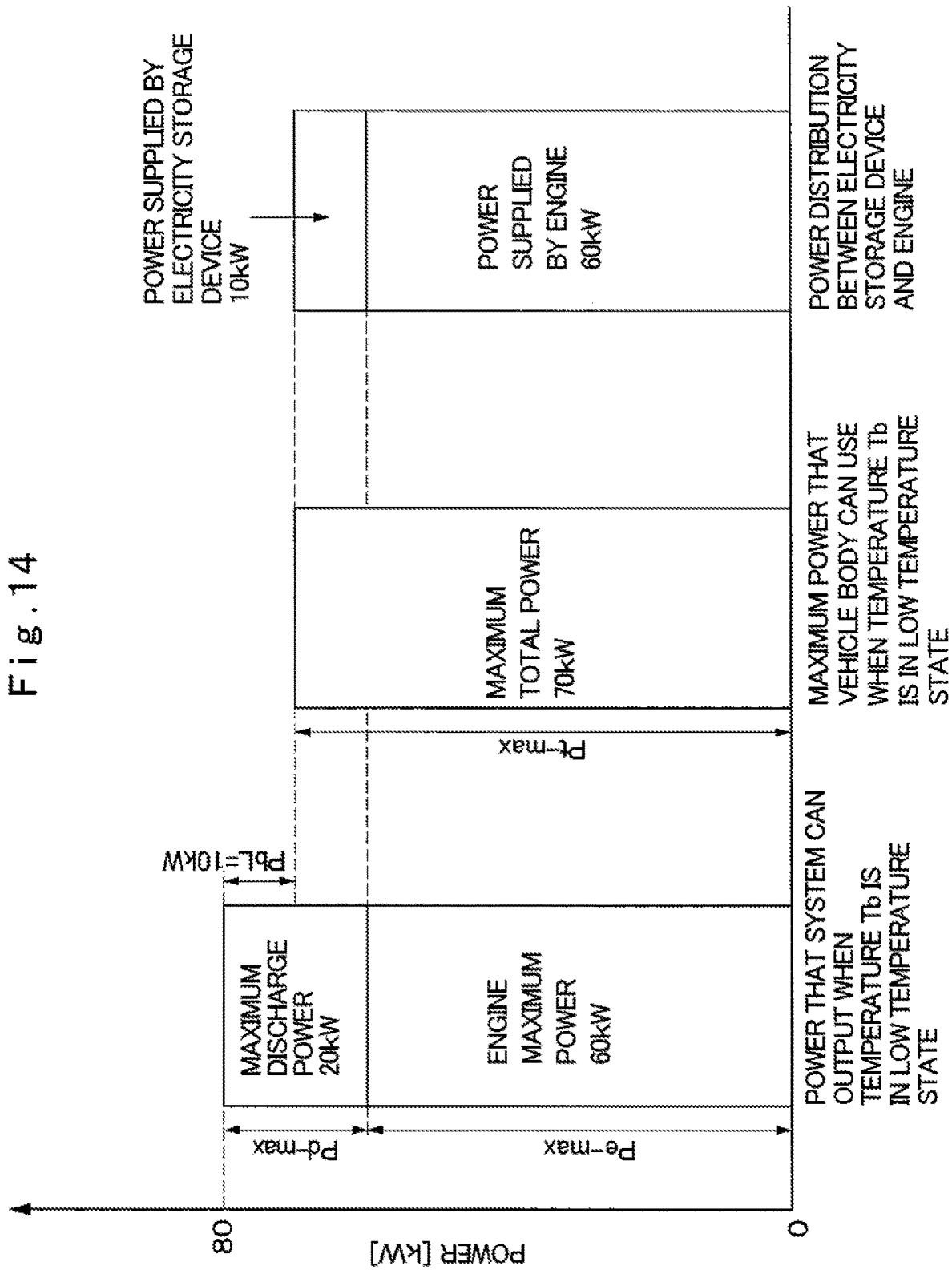
FIG. 14 is an explanatory diagram showing an example of output of an engine and a motor generator when a battery temperature is in a low temperature state and a hydraulic oil temperature is in a normal temperature state.
Figure 15:
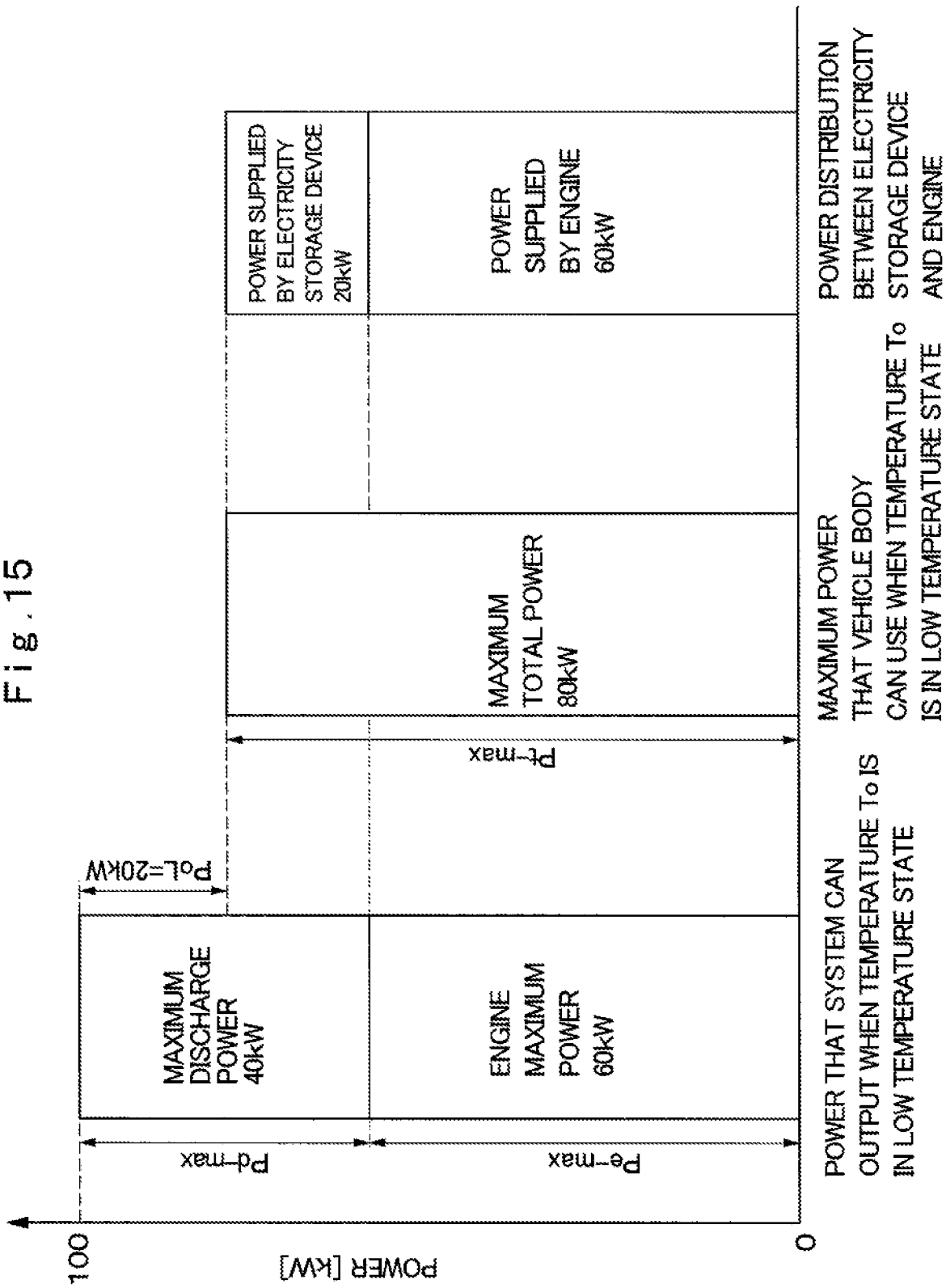
FIG. 15 is an explanatory diagram showing an example of output of an engine and a motor generator when a battery temperature is in a normal temperature state and a hydraulic oil temperature is in a low temperature state.
Figure 16:
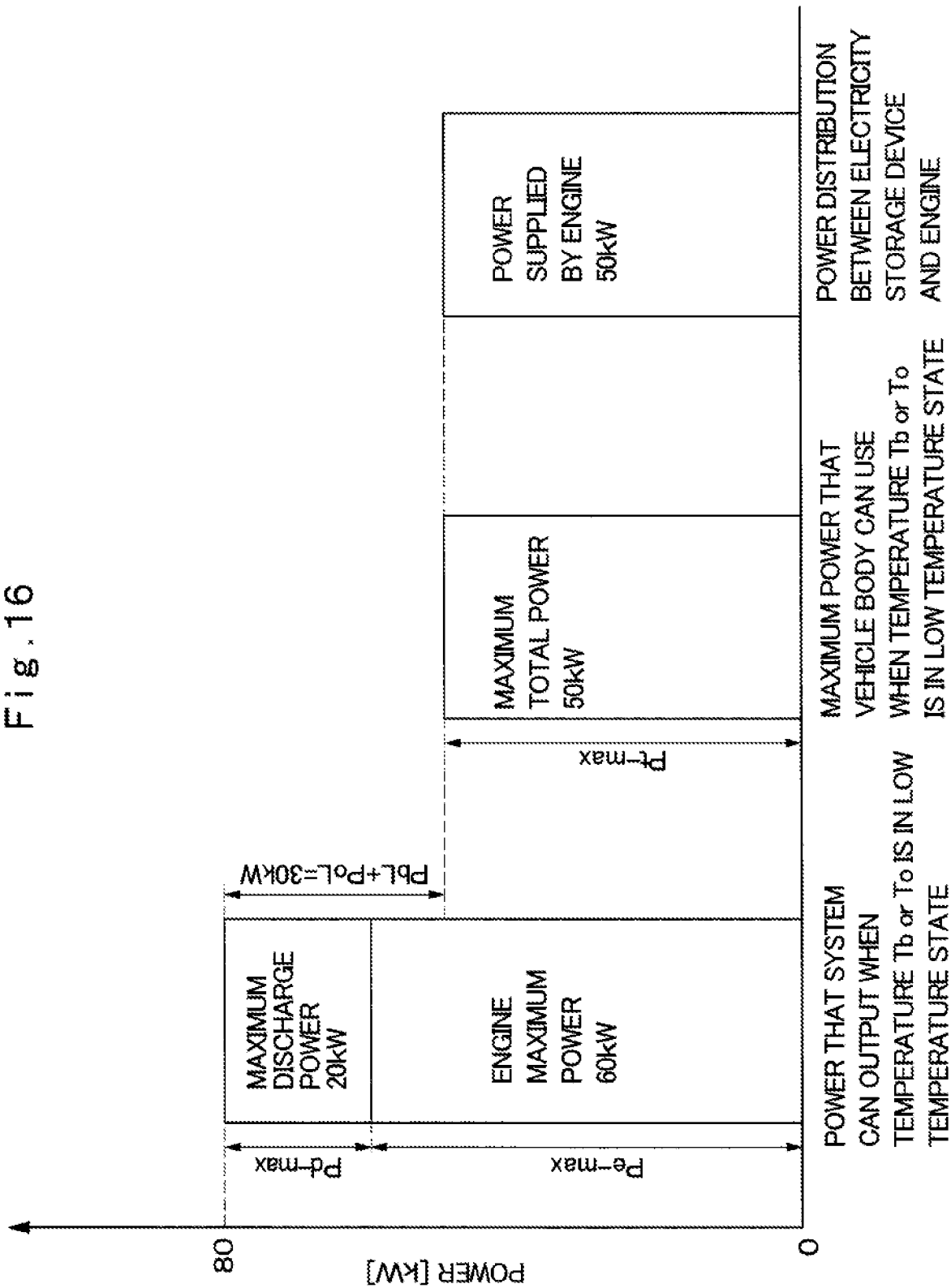
FIG. 16 is an explanatory diagram showing an example of output of an engine and a motor generator when both a battery temperature and a hydraulic oil temperature are in a low temperature state.

The hybrid hydraulic excavator 1 according to the present embodiment has the configuration as mentioned above. Next, an explanation will be made of the control of a burden ratio in the output between the engine 20 and the electricity storage device 31 by the HCU 37 in the low temperature state with reference to FIG. 14 to FIG. 16. In FIG. 14 to FIG. 16, the engine maximum power Pe-max is defined as 60 kW and the maximum discharge power Pd-max of the electricity storage device 31 in the low temperature state is defined as 40 kW. At this time, the maximum total power Pt-max is 100 kW when both of the battery temperature Tb and the hydraulic oil temperature To are in the normal temperature state.

It should be noted that the aforementioned value shows an example of the engine maximum power Pe-max or the maximum discharge power Pd-max, and is optionally changed according to the specification of the hydraulic excavator 1 or the like. In addition, for simplification of the explanation, the revolving operation will be not performed, and the revolving electric motor 34 will not execute any of the power running and the regeneration. In addition to this, the state of charge SOC is in a sufficient state and the battery is in an unnecessary state of the charge.

First, an explanation will be made of the control content of the HCU 37 in a case where the battery temperature Tb is in the low temperature state and the hydraulic oil temperature To is in the normal temperature state, with reference to FIG. 14.

In a case of activating the construction machine in a cold area, by temporarily sealing up an air inlet in a radiator room before an actual work, in some cases a warming operation of the vehicle body is performed in a state of suppressing a heat release effect in a machine chamber. At this time, the hydraulic oil temperature To quickly increases, but the battery temperature Tb does not necessarily increase in a speed equivalent thereto. Depending upon a design of the vehicle body system, but there is an enough possibility of occurrence of a situation where even when the hydraulic oil temperature To increases to the normal temperature, the battery temperature Tb is still in the low temperature region.

At this time, the maximum power calculating section 50 outputs the maximum discharge power Pd-max (for example, Pd-max=20 kW) that is reduced less than in the normal temperature state, in accordance with the battery temperature Tb. Therefore, a value of the output possible power of the system acquired by adding the motor generator maximum power running output Pmgm-max based upon the maximum discharge power Pd-max to the engine maximum power Pe-max amounts to 80 kW, for example. The low temperature reducing output calculating section 71 in the maximum output calculating section 70 outputs the battery low temperature reducing output PbL (for example, PbL=10 kW) that is increased more than in the normal temperature state, in accordance with the battery temperature Tb. On the other hand, the low temperature reducing output calculating section 71 in the maximum output calculating section 70 outputs the hydraulic oil low temperature reducing output PoL (for example, PoL=0 kW) in the normal temperature state, in accordance with the hydraulic oil temperature To.

Thereby, the maximum total power Pt-max is lower than in the normal temperature state, and becomes, for example, 70 kW by the battery low temperature reducing output PbL and the maximum discharge power Pd-max. Therefore, the output command calculating section 80 of the HCU 37 reduces the vehicle body speed less than in the normal temperature state in such a manner that the engine 20 supplies 60 kW and the electricity storage device 31 supplies 10 kW.

Second, an explanation will be made of the control content of the HCU 37 in a case where the battery temperature Tb is in the normal temperature state and the hydraulic oil temperature To is in the low temperature state with reference to FIG. 15.

There are present some construction machines that are provided with a function of performing a warming operation of the electricity storage device 31. It is considered that such a warming operation includes, for example, an operation of using self-heating of the electricity storage device 31 by repetition of the discharge and charge, an operation of supplying exhaust heat of the engine 20 to the electricity storage device 31 or the like. Since such a warming operation of the electricity storage device 31 is effective without performing the warming operation of the vehicle body, in a case where the construction machine is left for a little while after starting the engine alone, for example, there is an enough possibility of occurrence of a situation where even when the battery temperature Tb increases to the normal temperature, the hydraulic oil temperature To is still in the low temperature region.

At this time, the maximum power calculating section 50 outputs the maximum discharge power Pd-max (for example, Pd-max=40 kW) in the normal temperature state in accordance with the battery temperature Tb. Therefore, a value of the output possible power of the system acquired by adding the motor generator maximum power running output Pmgm-max to the engine maximum power Pe-max amounts to 100 kW, for example. The low temperature reducing output calculating section 71 in the maximum output calculating section 70 outputs the battery low temperature reducing output PbL (for example, PbL=0 kW) in the normal temperature state, in accordance with the battery temperature Tb. On the other hand, the low temperature reducing output calculating section 71 in the maximum output calculating section 70 outputs the hydraulic oil low temperature reducing output PoL (for example, PoL=20 kW)

that is increased more than in the normal temperature state, in accordance with the hydraulic oil temperature To.

Thereby, the maximum total power Pt-max is lower than in the normal temperature state, and becomes, for example, 80 kW by the hydraulic oil low temperature reducing output PoL and the maximum discharge power Pd-max. Therefore, the output command calculating section 80 of the HCU 37 reduces the vehicle body speed less than in the normal temperature state in such a manner that the engine 20 supplies 60 kW and the electricity storage device 31 supplies 20 kW.

Third, an explanation will be made of the control content of the HCU 37 in a case where both of the battery temperature Tb and the hydraulic oil temperature To are in the low temperature state, with reference to FIG. 16.

There are some cases where immediately after activating the construction machine in a cold area, any of the battery temperature Tb and the hydraulic oil temperature To are in the low temperature state depending upon an outside air temperature. At this time, the maximum power calculating section 50 outputs the maximum discharge power Pd-max (for example, Pd-max=20 kW) that is lowered less than in the normal temperature state, in accordance with the battery temperature Tb. Therefore, a value of the output possible power of the system acquired by adding the motor generator maximum power running output Pmgm-max based upon the maximum discharge power Pd-max to the engine maximum power Pe-max amounts to 80 kW, for example. The low temperature reducing output calculating section 71 in the maximum output calculating section 70 outputs the battery low temperature reducing output PbL (for example, PbL=10 kW) that is increased more than in the normal temperature state, in accordance with the battery temperature Tb. In addition to this, the low temperature reducing output calculating section 71 in the maximum output calculating section 70 outputs the hydraulic oil low temperature reducing output PoL (for example, PoL=20 kW) that is increased more than in the normal temperature state, in accordance with the hydraulic oil temperature To.

Thereby, the maximum total power Pt-max is lower than in the normal temperature state, and becomes, for example, 50 kW by the hydraulic oil low temperature reducing output PoL and the maximum discharge power Pd-max. At this time, the maximum total power Pt-max is lower than the engine maximum power Pe-max. Therefor, the output command calculating section 80 of the HCU 37 reduces the vehicle body speed less than in the normal temperature state in such a manner that the engine 20 alone can supply 50 kW.

Next, an explanation will be in detail made of the effect that is acquired by the control content of the HCU 37.

In general, a value of an upper limit value ISCmax of the current square integrated value is gradually made small in response to a reduction of the battery temperature Tb. Particularly, for example, in the low temperature state of approximately −20° C., even when a slight current Ib is inputted to or outputted from the electricity storage device 31, the current square integrated value ISC reaches the upper limit value ISCmax. Therefore, at the time of using the electricity storage device 31, it is necessary to keep this point in mind. The HCU 37 controls use of the electricity storage device 31 such that the current square integrated value ISC does not go beyond the upper limit value ISCmax in an optional temperature.

Incidentally, in a case of adopting the compact engine 20 in consideration of fuel consumption, the use frequency of the electricity storage device 31 increases. Therefore, in a case of sequentially performing a work of a large load, there is a possibility that an excessive rise of the current square integrated value ISC occurs. In this case, it is general to reduce the vehicle body speed and diminish the use of the electricity storage device 31 for avoiding degradation of the electricity storage device 31.

However, in a case where the battery temperature Tb is in the low temperature state, the upper limit value ISCmax of the current square integrated value is made very small. Therefore, in a case of reducing the vehicle body speed in response to an increase of the current square integrated value ISC, the vehicle body speed is reduced even by a slight operation. On the other hand, the vehicle body speed returns (recovers) from the reduced speed state even for a short time of cease. As a result, since the reduction and the recovery of the vehicle body speed are repeated in a quick cycle, it is expected to give large operation strange feelings to an operator.

Accordingly, it is necessary not to increase the current square integrated value ISC in the low temperature state. Therefore, a discharge amount or a charge amount as the use amount of the electricity storage device 31 is only required to be reduced.

To reduce the discharge amount of the electricity storage device 31 precisely means to reduce the power running operation of the motor generator 27, but the following problem occurs at this time. For example, when the power running operation of the motor generator 27 is directly limited, in a case where a sudden variation occurs in the hydraulic load, it is necessary to change the output of the engine 20 in response to the variation of the load. However, since the response speed in the output of the engine 20 is slower than that of the motor generator 27, the hydraulic load cannot be borne, posing a problem that an excessive lug-down or a sudden stop of the engine 20 occurs.

Further, it is necessary to consider an influence of the hydraulic oil viscosity of which increases in addition to a performance reduction of the electricity storage device 31 in the low temperature state. The increasing viscosity of the hydraulic oil generates a drag torque increase of the hydraulic pump 22. Therefore, in the low temperature state of the hydraulic oil temperature To, even when the input to the hydraulic pump 22 is the same amount as that in the normal temperature state, the pump output to be acquired is made small. Accordingly, also when the vehicle body is operated without considering such a reduced amount of the pump output, the excessive lug-down or sudden stop possibly occurs in the engine 20.

On the other hand, the present embodiment adopts together two kinds of methods composed of a method of limiting the vehicle body speed and a method of limiting the power itself for reducing the use of the electricity storage device 31 in the low temperature state.

The method of limiting the vehicle body speed is realized by the hydraulic oil low temperature reducing output PoL and the battery low temperature reducing output PbL that are calculated by the low temperature reducing output calculating section 71. The method of limiting the power is realized by the maximum discharge power Pd-max and the maximum charge power Pc-max that are calculated by the maximum power calculating section 50.

The motor generator maximum output calculating section 74 calculates the motor generator maximum power running output Pmgm-max and the motor generator maximum power generation output Pmgg-max based upon the maximum discharge power Pd-max and the maximum charge power Pc-max. The maximum total power calculating section 75 calculates the maximum total power Pt-max in consideration of the hydraulic oil low temperature reducing output PoL, the battery low temperature reducing output PbL and the motor generator maximum power running output Pmgm-max. The output command calculating section 80 controls the vehicle body speed not to exceed the maximum total power Pt-max. In addition to this, the output command calculating section 80 controls the discharge power and the charge power of the electricity storage device 31 not to exceed the motor generator maximum power running output Pmgm-max and the motor generator maximum power generation output Pmgg-max.

As a result, when the battery temperature Tb or the hydraulic oil temperature To is in the low temperature state, it is possible to reduce the vehicle body speed by the maximum total power Pt-max. On the other hand, by the motor generator maximum power running output Pmgm-max, the power running operation of the motor generator 27 is limited, while the power running operation can be allowed to some degree. Consequently, it is possible to reduce the vehicle body speed to be within a range of the output that can be supplied by the engine 20 and the electricity storage device 31.

At this time, the output of the maximum total power Pt-max is to be reduced by the output in accordance with a sum of the hydraulic oil low temperature reducing output PoL and the battery low temperature reducing output PbL. Therefore, by the maximum total power Pt-max, not only the output of the electricity storage device 31 but also the entire output including the engine 20 can be lowered. Accordingly, for example, since the vehicle body speed can be made lower than the maximum output of the engine 20, it is possible to reduce the use frequency of the electricity storage device 31. As a result, since it is possible to suppress an increase in the current square integrated value ISC, it is difficult for the current square integrated value ISC to reach the upper limit value ISCmax. Consequently, the reduction and the recovery of the vehicle body speed are not repeated in a quick cycle, thus making it possible to reduce the operation strange feelings of the operator.

In addition to this, the use amount of the electricity storage device 31 is reduced by the reduction in the vehicle body speed. Therefore, the discharge amount of the electricity storage device 31 is limited by the maximum discharge power Pd-max, but the use is allowable to some degree. Accordingly, when the hydraulic load suddenly changes, a variation amount of the hydraulic load can be borne by the power running operation of the motor generator 27, and the lug-down and the rapid stop of the engine 20 can be suppressed.

In addition, when the hydraulic oil temperature To becomes in the low temperature state, it is possible to reduce the vehicle body speed by the hydraulic oil low temperature reducing output PoL different from the battery low temperature reducing output PbL. Accordingly, even when the output of the hydraulic pump 22 is reduced by the increase in viscosity of the hydraulic oil in the low temperature state, it is possible to reduce the vehicle body speed in consideration of the reduced amount. As a result, it is possible to suppress the excessive load to the engine 20.

In this way, according to the present embodiment, the HCU 37 includes the battery low temperature reducing output calculating section 71A (First vehicle body speed reduction amount determining section) that determines, when it is determined that the electricity storage device 31 is in the low temperature state based upon the temperature detected by the battery temperature sensor 33 (electricity storage device temperature sensor), the battery low temperature reducing output PbL (first vehicle body speed reduction amount) that is made to a larger value as the temperature of the battery temperature Tb is lower, the hydraulic oil low temperature reducing output calculating section 71B (second vehicle body speed reduction amount determining section) that determines, when it is determined that the hydraulic oil is in the low temperature state based upon the temperature detected by the hydraulic oil temperature sensor 23, the hydraulic oil low temperature reducing output PoL (second vehicle body speed reduction amount) that is made to a larger value as the hydraulic oil temperature To is lower, and the output command calculating section 80 (vehicle body operation control part) that controls the vehicle body operation based upon a sum of the battery low temperature reducing output PbL and the hydraulic oil low temperature reducing output PoL. That is, the output command calculating section 80 operates the vehicle body in a state of reducing the sum of the battery low temperature reducing output PbL and the hydraulic oil low temperature reducing output PoL.

Accordingly, the HCU 37 can reduce the vehicle body speed regardless of the current square integrated value ISC when the battery temperature Tb is low. Thereby, a vehicle body speed variation due to a quick change in the current square integrated value ISC because of the low temperature is suppressed to reduce the operation stress of an operator and prevent the lug-down or the sudden stop (engine stall) of the engine 20, making it possible to enhance the degradation suppression effect of the electricity storage device 31.

In addition to this, the HCU 37 calculates the battery low temperature reducing output PbL due to being low in the battery temperature Tb and the hydraulic oil low temperature reducing output PoL due to being low in the hydraulic oil temperature To individually, and reflects a total speed reduction amount of them on the vehicle body speed, thus controlling the vehicle body. Thereby, in a state where the hydraulic oil temperature To is low but the battery temperature Tb is high or even in the reverse state, an appropriate speed reduction can be performed and the vehicle body operation performance can be ensured.

The HCU 37 further includes the maximum charge power calculating section 52 (charge power maximum value adjusting part) that, when it is determined that the electricity storage device 31 is in the low temperature state by the battery temperature Tb detected by the battery temperature sensor 33, makes the motor generator maximum power generation output Pmgg-max as the charge power maximum value of the electricity storage device 31 the smaller as the battery temperature Tb is the lower, and the output command calculating section 80 controls the motor generator 27 such that the charge power does not exceed the motor generator maximum power generation output Pmgg-max.

Specifically, the maximum charge power calculating section 52 limits the power generation output of the motor generator 27 regardless of the current square integrated value ISC when the battery temperature Tb is low. Thereby, it is possible to suppress an increase in the current square integrated value ISC.

In addition to this, the HCU 37 includes the maximum power calculating section 50 that preferentially limits the power generation output of the motor generator 27 to the power running output thereof regardless of the current square integrated value ISC when the battery temperature Tb is low. That is, in the low temperature region an absolute value of the maximum charge power Pc-max (motor generator maximum power generation output Pmgg-max) is smaller than that of the maximum discharge power Pd-max (motor generator maximum power running output Pmgm-max). Consequently, it is possible to suppress an increase in the current square integrated value ISC, while reducing the reduction amount of the vehicle body speed to the minimum limit. In addition, since the power running operation of the motor generator 27 is to be prioritized, the rapid variation in the hydraulic load is allowable.

The HCU 37 further includes the maximum discharge power calculating section 51 (discharge power maximum value adjusting part) that, when it is determined that the electricity storage device 31 is in the low temperature state by the battery temperature Tb detected by the battery temperature sensor 33, makes the motor generator maximum power running output Pmgm-max as the discharge power maximum value of the electricity storage device 31 the smaller as the battery temperature Tb is the lower. The output command calculating section 80 controls the motor generator 27 not to exceed a value acquired by subtracting a reducing output additional value as a sum of the battery low temperature reducing output PbL and the hydraulic oil low temperature reducing output PoL from a maximum output additional value as a sum of the engine maximum power Pe-max and the motor generator maximum power running output Pmgm-max.

Specifically, the maximum discharge power calculating section 51 limits the power running output of the motor generator 27 regardless of the current square integrated value ISC when the battery temperature Tb is low. At this time, the output command calculating section 80 lowers the maximum output additional value as the power that the system can output, based upon the motor generator maximum power running output Pmgm-max lowered in accordance with the battery temperature Tb. In addition to this, the output command calculating section 80 controls the motor generator 27 not to exceed a value acquired by subtracting a reducing output additional value as a sum of the battery low temperature reducing output PbL and the hydraulic oil low temperature reducing output PoL from the lowered power. Thereby, it is possible to suppress an increase in the current square integrated value ISC.

In addition, the HCU 37 further includes the current square integrated value calculating section 41 that calculates the current square integrated value ISC of the electricity storage device 31 for a constant time from the present to the past, and the first vehicle body speed reduction amount adjusting section 91 that, when the current square integrating ratio Risc corresponding to the current square integrated value ISC exceeds the predetermined proper reference value Rm1, makes the battery low temperature reducing output PbL the larger as the exceeded amount is the larger.

That is, in a case where the current square integrated value ISC of the electricity storage device 31 becomes large in a state where the vehicle body speed is reduced according to a reduction in the battery temperature Tb, the HCU 37 performs control of further reducing the vehicle body speed. Consequently, even in a case where the current square integrated value ISC becomes large by an unexpected operation, it is possible to prevent a further increase of the current square integrated value ISC.

The HCU 37 further includes a Charge power maximum value reduction section 93 that makes the motor generator maximum power generation output Pmgg-max as the charge power maximum value of the electricity storage device 31 further small in a case where the current square integrating ratio Risc exceeds the upper limit value Rg2 as a value larger than the proper reference value Rg1. At this time, the HCU 37 performs control of further lowering the power generation by the motor generator 27 in a case where the current square integrated value ISC of the electricity storage device 31 becomes large in a state where the power generation by the motor generator 27 is limited, according to a reduction in the battery temperature Tb. Consequently, even in a case where the current square integrated value ISC becomes large by an unexpected operation, it is possible to prevent an excessive increase of the current square integrated value ISC and suppress degradation of the electricity storage device 31. Further, the HCU 37 further includes a discharge power maximum value reduction section 92 that makes the motor generator maximum power running output Pmgm-max as the discharge power maximum value of the electricity storage device 31 further small in a case where the current square integrating ratio Risc exceeds the upper limit value Rm2 as a value larger than the predetermined proper reference value Rm1. At this time, in a case where the current square integrated value ISC of the electricity storage device 31 becomes further large in a state where the vehicle body speed is reduced according to a reduction in the battery temperature Tb or the hydraulic oil temperature To, the HCU 37 performs control of limiting the power running of the motor generator 27. Consequently, even in a case where the current square integrated value ISC becomes large by an unexpected operation, it is possible to prevent an excessive increase of the current square integrated value ISC and improve a suppression effect to degradation of the electricity storage device 31.

In the above embodiment, the maximum output of the engine 20 is made smaller than the maximum power of the hydraulic pump 22, but the maximum output of the engine 20 is optionally set according to a specification of the hydraulic excavator 1 or the like. Therefore, the maximum output of the engine 20 may be approximately the same as the maximum power of the hydraulic pump 22, or may be larger than the maximum power of the hydraulic pump 22.

In the above embodiment, an example of using the lithium ion battery in the electricity storage device 31 is explained, but a secondary battery (for example, a nickel cadmium battery or nickel hydrogen battery) that can supply required power may be adopted. In addition, a step-up and -down device such as a DC-DC converter may be provided between the electricity storage device and the DC bus.

In the above embodiment, an example of using the hybrid hydraulic excavator 1 of a crawler type as the hybrid construction machine is explained. However, the present invention is not limited thereto, but the present invention may be applied to a hybrid construction machine that is only provided with a motor generator jointed to an engine and a hydraulic pump, and an electricity storage device, and may be applied to various types of construction machines such as a wheel type hybrid hydraulic excavator or a hybrid wheel loader.

DESCRIPTION OF REFERENCE NUMERALS

1: Hybrid hydraulic excavator (Hybrid construction machine)
2: Lower traveling structure
4: Upper revolving structure
12: Working mechanism
12D: Boom cylinder (Hydraulic actuator)
12E: Arm cylinder (Hydraulic actuator)
12F: Bucket cylinder (Hydraulic actuator)
20: Engine
22: Hydraulic pump 23: Hydraulic oil temperature sensor (Hydraulic oil temperature detector)
25: Traveling hydraulic motor (Hydraulic actuator)
26: Revolving hydraulic motor (Hydraulic actuator)
27: Motor generator
31: Electricity storage device
32: Battery control unit
33: Battery temperature sensor (Electricity storage device temperature detector)
34: Revolving electric motor (Revolving generator)
37: Hybrid control unit (Controller)
40: Current square integrating ratio calculating section
41: Current square integrated value calculating section
50: Maximum power calculating section
51: Maximum discharge power calculating section (Discharge power maximum value adjusting part)
52: Maximum charge power calculating section (Charge power maximum value adjusting part)
70: Maximum output calculating section
71: Low temperature reducing output calculating section
71A: Battery low temperature reducing output calculating section (First vehicle body speed reduction amount determining section)
71B: Hydraulic oil low temperature reducing output calculating section (Second vehicle body speed reduction amount determining section)
72: Motor generator output limit gain calculating section
72A: Power running limit gain calculating section
72B: Power generation limit gain calculating section
74: Motor generator maximum output calculating section
75: Maximum total power calculating section
80: Output command calculating section (Vehicle body operation control part)
91: Vehicle body speed reduction amount adjusting section
92: Discharge power maximum value reduction section
93: Charge power maximum value reduction section

The invention claimed is:

1. A hybrid construction machine comprising:
an engine;
a motor generator that is connected mechanically to the engine;
an electricity storage device that charges at a power generation operation of the motor generator and discharges at a power running operation of the motor generator;
a hydraulic pump that is driven by torque of the engine and the motor generator;
a plurality of hydraulic actuators that are driven by hydraulic oil delivered from the hydraulic pump;
a controller that controls output of the engine and the motor generator;
an electricity storage device temperature detector that detects a temperature of the electricity storage device; and
a hydraulic oil temperature detector that detects a temperature of the hydraulic oil, wherein,
when it is determined that the electricity storage device is in a low temperature state based upon the temperature detected by the electricity storage device temperature detector, the controller sets a first vehicle body speed reduction amount to a larger value corresponding to a lowering degree from a normal temperature of the electricity storage device;
when it is determined that the hydraulic oil is in a low temperature state based upon the temperature detected by the hydraulic oil temperature detector, the controller sets a second vehicle body speed reduction amount to a larger value corresponding to the lowering degree from a normal temperature of the hydraulic oil; and
the controller controls a vehicle body operation based upon a sum of the first vehicle body speed reduction amount and the second vehicle body speed reduction amount.

2. The hybrid construction machine according to claim 1, wherein,
when it is determined that the electricity storage device is in the low temperature state by the temperature detected by the electricity storage device temperature detector, the controller sets a discharge power maximum value of the electricity storage device to a smaller value corresponding to the lowering degree from the normal temperature of the electricity storage device; and
the controller controls the motor generator not to exceed a value acquired by subtracting a reducing output additional value as a sum of the first vehicle body speed reducing amount and the second vehicle body speed reducing amount from a maximum output additional value as a sum of maximum output of the engine and the discharge power maximum value.

3. The hybrid construction machine according to claim 2, wherein,
when it is determined that the electricity storage device is in the low temperature state by the temperature detected by the electricity storage device temperature detector, the controller sets a charge power maximum value of the electricity storage device to the smaller value corresponding to the lowering degree from the normal temperature of the electricity storage device; and
the controller controls the motor generator such that the charge power does not exceed the discharge power maximum value.

4. The hybrid construction machine according to claim 3, wherein,
when it is determined that the electricity storage device is in the low temperature state by the temperature detected by the electricity storage device temperature detector, the controller sets an absolute value of the charge power maximum value to a value smaller than an absolute value of the discharge power maximum value.

5. The hybrid construction machine according to claim 1, wherein
the controller calculates a current square integrated value of the electricity storage device for a constant time from present to past; and,
when the current square integrated value exceeds a predetermined first reference value, the controller makes a vehicle body speed lower than the first vehicle body speed reduction amount as an exceeded amount becomes larger.

6. The hybrid construction machine according to claim 3, wherein
the controller calculates a current square integrated value of the electricity storage device for a constant time from present to past; and,
when the current square integrated value exceeds a second reference value larger than a predetermined first reference value, the controller sets a charge power maximum value of the electricity storage device to a smaller value as compared to a case where the current square integrated value is smaller than the second reference value.

7. The hybrid construction machine according to claim 6, wherein the controller calculates a current square integrated value of the electricity storage device for a constant time from present to past; and, when the current square integrated value exceeds a third reference value as a value larger than a predetermined first reference value, the controller sets a discharge power maximum value of the electricity storage device to a smaller value as compared to a case where the current square integrated value is smaller than the third reference value.

\* \* \* \* \*